US012353158B2

(12) United States Patent
Inada et al.

(10) Patent No.: US 12,353,158 B2
(45) Date of Patent: Jul. 8, 2025

(54) IMAGE FORMING APPARATUS

(71) Applicant: CANON KABUSHIKI KAISHA, Tokyo (JP)

(72) Inventors: Seiji Inada, Ibaraki (JP); Kunihiro Niwa, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/741,494

(22) Filed: Jun. 12, 2024

(65) Prior Publication Data

US 2024/0329591 A1 Oct. 3, 2024

Related U.S. Application Data

(63) Continuation of application No. 18/328,106, filed on Jun. 2, 2023, now Pat. No. 12,032,321.

(30) Foreign Application Priority Data

Jun. 6, 2022 (JP) ................................ 2022-091901

(51) Int. Cl.
*G03G 15/00* (2006.01)
*G03G 15/01* (2006.01)
*G03G 21/16* (2006.01)

(52) U.S. Cl.
CPC ......... *G03G 15/80* (2013.01); *G03G 15/0142* (2013.01); *G03G 15/6552* (2013.01);
(Continued)

(58) Field of Classification Search
CPC ............... G03G 15/80; G03G 15/0142; G03G 15/6552; G03G 21/1638; G03G 21/1647; G03G 21/1652
See application file for complete search history.

(56) References Cited

U.S. PATENT DOCUMENTS

2012/0105563 A1* 5/2012 Sakita .................. G02B 26/127 347/118
2013/0223868 A1* 8/2013 Eom .................. G03G 21/1652 399/88
(Continued)

FOREIGN PATENT DOCUMENTS

JP 2020-183047 A 11/2020

*Primary Examiner* — Joseph S Wong
(74) *Attorney, Agent, or Firm* — VENABLE LLP

(57) ABSTRACT

An image forming apparatus includes an apparatus body, and an opening/closing cover configured to expose an opening portion of the apparatus body by being opened. The apparatus body includes a main body frame, a plurality of conveyance units being detachably attached to the main body frame through the opening portion, a control board configured to control the plurality of conveyance units, and a relay board configured to be electrically connected to the control board. The plurality of conveyance units respectively include a plurality of first connectors. The relay board includes a plurality of second connectors that are arranged to face the opening portion and that are configured to be connected to the plurality of first connectors, the relay board being arranged at a position not interfering with attachment/detachment loci in which the plurality of conveyance units are attached to and detached from the main body frame.

12 Claims, 20 Drawing Sheets

(52) U.S. Cl.
CPC ..... *G03G 21/1638* (2013.01); *G03G 21/1647* (2013.01); *G03G 21/1652* (2013.01)

(56) References Cited

U.S. PATENT DOCUMENTS

| | | | |
|---|---|---|---|
| 2016/0109845 | A1 | 4/2016 | Ohata |
| 2016/0282803 | A1 | 9/2016 | Osaki |
| 2020/0310327 | A1 | 10/2020 | Kanno |

* cited by examiner

IMAGE FORMING APPARATUS

CROSS REFERENCE TO RELATED APPLICATIONS

This application is a continuation of U.S. patent application Ser. No. 18/328,106 filed Jun. 2, 2023, which is claims priority to Japanese Application No. 2022-091901, filed on Jun. 6, 2022, the contents of each of which are incorporated by reference herein.

BACKGROUND OF THE INVENTION

Field of the Invention

The present invention relates to image forming apparatuses for forming images on sheets.

Description of the Related Art

Hitherto, there has been proposed an image forming apparatus equipped with an optical print head that emits light for forming a latent image on a photosensitive member, a tray for drawing the optical print head out of the image forming apparatus, and a relay board fixed to a support member (refer to Japanese Patent Application Laid-Open Publication No. 2020-183047). The relay board is equipped with a first connector that can be connected to a control board through a flexible flat cable (FFC), and a second connector that can be connected to the optical print head through an FFC.

However, according to the disclosure of the Japanese Patent Application Laid-Open Publication No. 2020-183047, the second connector of the relay board is not exposed even if the cover constituting an exterior of the image forming apparatus is opened, such that there was a problem in the maintenance property thereof. Image forming apparatuses configured to be divided into a plurality of units having different functions are known, each of the plurality of units being detachably attached to a main body frame. There is a desire to improve the maintenance performance of such units.

SUMMARY OF THE INVENTION

According to one aspect of the present invention, an image forming apparatus includes an apparatus body including an image forming unit configured to form an image on a sheet, and an opening/closing cover supported in an openable and closable manner on the apparatus body and configured to expose an opening portion of the apparatus body by being opened with respect to the apparatus body. The apparatus body includes a main body frame, a plurality of conveyance units configured to convey the sheet and being detachably attached to the main body frame through the opening portion, a control board configured to control the plurality of conveyance units, and a relay board configured to be electrically connected to the control board. The plurality of conveyance units respectively include a plurality of first connectors. The relay board includes a plurality of second connectors that are arranged to face the opening portion and that are configured to be connected to the plurality of first connectors, the relay board being arranged at a position not interfering with attachment/detachment loci in which the plurality of conveyance units are attached to and detached from the main body frame.

Further features of the present invention will become apparent from the following description of exemplary embodiments with reference to the attached drawings.

DESCRIPTION OF THE EMBODIMENTS

Now, an image forming apparatus according to the present embodiment will be described with reference to the drawings. Unless stated otherwise, sizes, materials, shapes, and relative arrangements of components described in the following description of embodiments are not intended to limit the scope of application of the present technique.

General Configuration of Image Forming Apparatus

Figure 1:
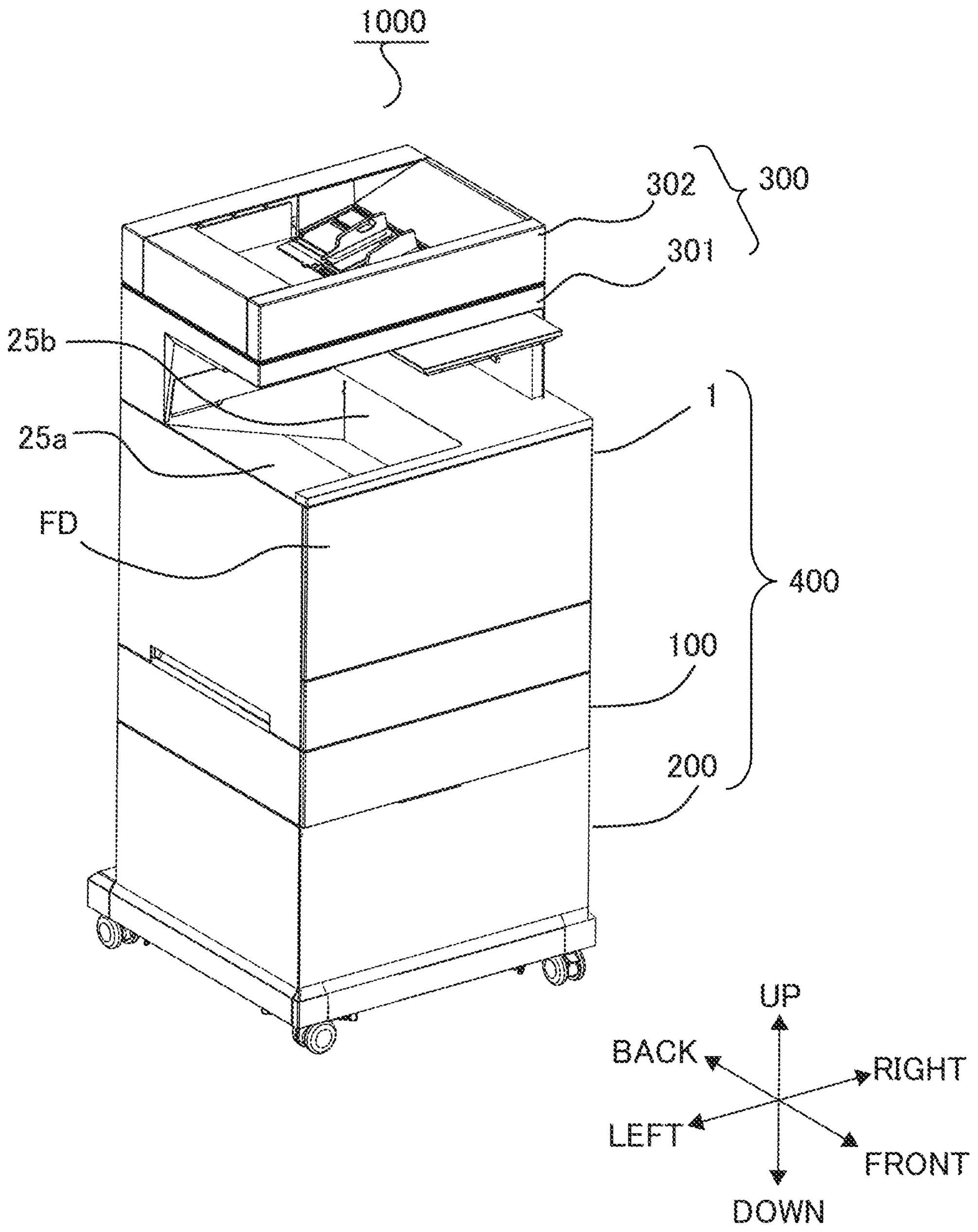
FIG. 1 is a general perspective view illustrating an image forming apparatus according to a present embodiment.

At first, a general configuration of an image forming apparatus 1000 will be described with reference to FIG. 1. In FIG. 1, arrows in both directions denoted with the terms "front", "back", "up", "down", "right", and "left" indicate directions based on the image forming apparatus 1000. "Front" denotes aside on which a front door FD of the image forming apparatus 1000 is attached, which is also referred to as a front face. "Back" refers to a rear side opposite to the front door FD of the image forming apparatus 1000, which is also referred to as a rear face. "Up" refers to an upper side in a vertical direction of the image forming apparatus 1000, and "down" refers to a lower side in the vertical direction of the image forming apparatus 1000. Further, "right" denotes a right side in a state where the image forming apparatus 1000 is viewed from the front door FD side, and "left" denotes a left side in a state where the image forming apparatus 1000 is viewed from the front door FD side.

As illustrated in FIG. 1, the image forming apparatus 1000 includes a printer 400 and an image reading portion 300. The image reading portion 300 arranged above the printer 400 specifically includes a reading unit 301 and an auto document feeder (ADF) 302, and scans a document optically to read the image information. Documents can be paper such as normal paper and envelopes, plastic films such as a plastic sheet for an overhead projector (overhead transparency OHT), and cloth. The image information converted into electric signals by the image reading portion 300 is transferred to an image processing controller 26 (refer to FIG. 3) disposed in the printer 400.

Figure 2:
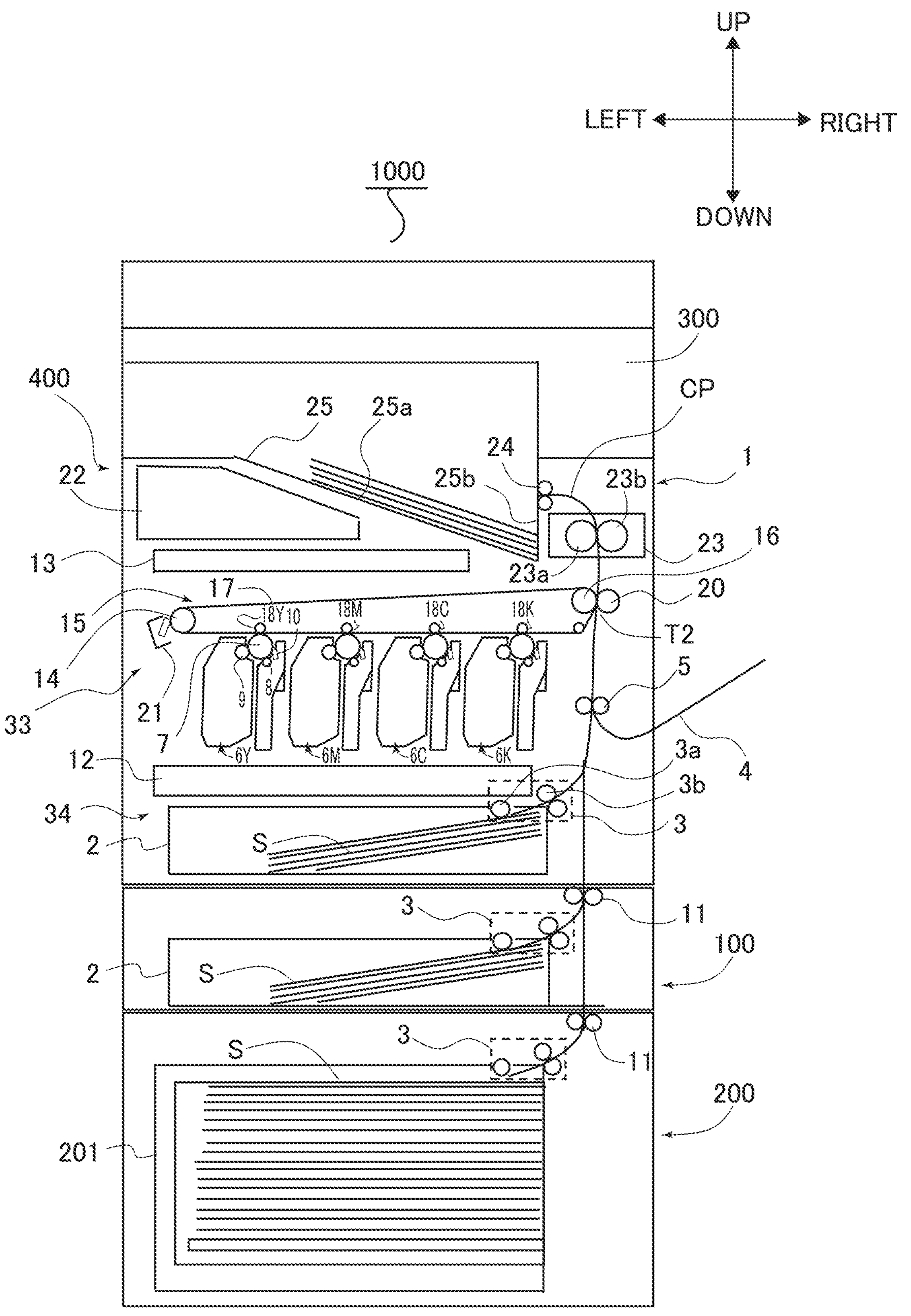
FIG. 2 is an entire schematic diagram illustrating the image forming apparatus.

The printer 400 includes, as illustrated in FIGS. 1 and 2, a printer body 1, an optional feeder 100 that is connected to a lower part of the printer body 1, and a large capacity sheet feed deck 200 connected to a lower part of the feeder 100. The large capacity sheet feed deck 200 can be connected to a lower part of the printer body 1 instead of to the lower part of the feeder 100.

The printer body 1 includes an image forming unit 33 that forms an image on a sheet serving as a recording medium, a fixing unit 23, a sheet discharge roller pair 24, and a sheet feeding apparatus 34 that feeds sheets S to the image forming unit 33. The sheet feeding apparatus 34 includes a cassette 2 capable of storing sheets S, and a feeding portion 3. The feeding portion 3 includes a pickup roller 3*a* for feeding sheets S stored in the cassette 2, and a separation roller pair 3*b* for separating the sheets S fed by the pickup roller 3*a* sheet by sheet.

The feeder 100 similarly includes the cassette 2 capable of storing sheets S, and the feeding portion 3 for feeding the sheets stored in the cassette 2. The feeder 100 also includes an intermediate conveyance roller pair 11 that conveys the sheet S fed from the feeding portion toward the printer body 1. The large capacity sheet feed deck 200 includes a feeding deck 201, the feeding portion 3, and the intermediate conveyance roller pair 11. The feeding deck 201 can store more sheets S than the cassette 2, and for example, it can store approximately 2000 sheets S.

The image forming unit 33 is equipped with four process cartridges 6Y, 6M, 6C, and 6K for forming toner images of four colors, which are yellow (Y), magenta (M), cyan (C), and black (K), a scanner unit 12, and an intermediate transfer unit 15. The process cartridges 6Y, 6M, 6C, and 6K are detachably attached to a casing of the printer body 1. The four process cartridges 6Y, 6M, 6C, and 6K adopt the same configuration except for the different colors of images being formed. Therefore, the configuration and image forming processes of the process cartridge 6Y will be described, and the descriptions on the process cartridges 6M, 6C, and 6K are omitted.

The process cartridge 6Y includes a photosensitive drum 7 serving as an image bearing member, a charging roller 8, a developing roller 9, and a cleaner 10. The photosensitive drum 7 is configured by applying an organic photoconductive layer on an outer circumference of an aluminum cylinder, and it is rotated by a drive motor not shown. The scanner unit 12 is arranged below the process cartridges 6Y, 6M, 6C, and 6K.

The intermediate transfer unit 15 is arranged above the process cartridges 6Y, 6M, 6C, and 6K, and includes an intermediate transfer belt 17 wound around a driving roller 16 and a tension roller 14. Primary transfer rollers 18Y, 18M, 18C, and 18K are disposed on an inner side of the intermediate transfer belt 17.

A secondary transfer roller 20 that forms a secondary transfer nip T2 with an intermediate transfer belt 17 is arranged on an opposite side of the driving roller 16 interposing the intermediate transfer belt 17. Further, a cleaning unit 21 is arranged on an opposite side of the tension roller 14 interposing the intermediate transfer belt 17. A high-voltage power supply board 13 serving as a power supply board for generating voltage applied to the charging roller 8, the developing roller 9, the primary transfer rollers 18Y, 18M, 18C, and 18K, and the secondary transfer roller 20 are arranged above the intermediate transfer unit 15. Further, a toner collecting container 22 that stores toner removed from the intermediate transfer belt 17 by the cleaning unit 21 is arranged between the high-voltage power supply board 13 and a sheet tray 25 in the vertical direction. The fixing unit 23 includes a heating unit 23*a* including a heat source such as a heater, and a pressure roller 23*b* forming a fixing nip together with the heating unit 23*a*.

Next, an image forming operation of the image forming apparatus 1000 configured as above will be described. In a state where an image signal from a personal computer not shown or the image reading portion 300 is entered to the scanner unit 12, a laser light corresponding to the image signal is irradiated from the scanner unit 12 onto the photosensitive drum 7 of the process cartridge 6Y.

In this state, the surface of the photosensitive drum 7 is uniformly charged in advance to predetermined polarity and potential by the charging roller 8, and in a state where laser light is irradiated from the scanner unit 12, an electrostatic latent image is formed on the surface. The electrostatic latent image formed on the photosensitive drum 7 is developed by the developing roller 9, and a yellow (Y) toner image is formed on the photosensitive drum 7.

Similarly, laser light is irradiated from the scanner unit 12 to the respective photosensitive drums of the process cartridges 6, 6C, and 6K, and toner images of magenta (M), cyan (C), and black (K) are formed on the respective photosensitive drums. The toner images of respective colors formed on the respective photosensitive drums are transferred to the intermediate transfer belt 17 from the primary transfer rollers 18Y, 18M, 18C, and 18K, and conveyed to the secondary transfer roller 20 by the intermediate transfer belt 17 rotated by the driving roller 16. Toner remaining on the photosensitive drum 7 is removed by the cleaner 10. Further, image forming processes of respective colors are performed at such a timing that the toner image is superposed on a toner image that has been primarily transferred to the intermediate transfer belt 17 upstream thereof.

In parallel with the image forming process, a sheet S is fed from the sheet feeding apparatus 34 of the printer body 1, the feeder 100, or the large capacity sheet feed deck 200. Then, the sheet S is conveyed to a registration roller pair 5 and abuts against a nip of the registration roller pair 5 in a stopped state, by which skewing of the sheet S is corrected.

The registration roller pair 5 conveys the sheet S in correspondence with the image transfer timing, and a full color toner image on the intermediate transfer belt 17 is transferred to the sheet S at the secondary transfer nip T2 by a secondary transfer bias applied to the secondary transfer roller 20. Toner remaining on the intermediate transfer belt 17 is conveyed by the cleaning unit 21 to the toner collecting container 22. Heat and pressure are applied at the fixing unit 23 to the sheet S to which the toner image has been transferred, and toner is melted and fixed thereby. The sheet having passed the fixing unit 23 is discharged to the sheet tray 25 by the sheet discharge roller pair 24.

Configuration of Rear Side Portion of Printer Body

Figure 3:
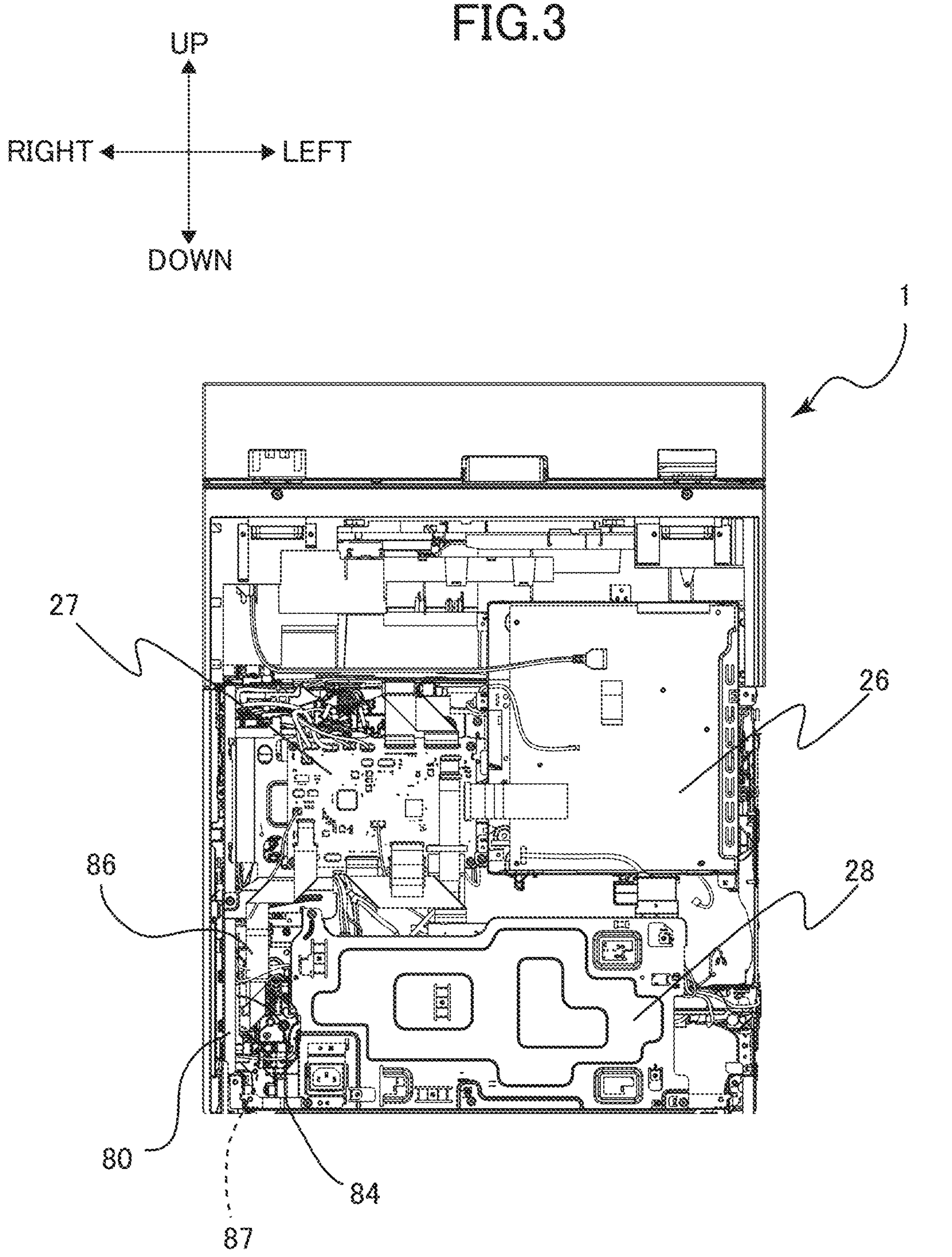
FIG. 3 is a rear view illustrating a rear side portion of a printer body.

Next, a configuration of a rear side portion of the printer body 1 will be described with reference to FIG. 3. FIG. 3 is a rear view illustrating a state in which an exterior cover on a rear face of the printer body 1 has been removed. As illustrated in FIG. 3, the image processing controller 26, a controller board 27 serving as a control board, and a power supply device 28 are disposed on a rear side portion of the printer body 1. The image processing controller 26 processes signals received from an input device such as a personal computer, and instructs a print job to the controller board 27. The controller board 27 receives a print job from the image processing controller 26, and controls respective units of the printer 400 (refer to FIG. 1) to execute the printing process. The power supply device 28 is connected to respective units of the high-voltage power supply board 13, the image processing controller 26, the controller board 27, and the image forming apparatus 1000 by metal bundle wires, and supplies power to respective units of the image forming apparatus 1000 (refer to FIG. 1). The power supply device 28 is also connected to the feeder 100 and the large capacity sheet feed deck 200 by metal bundle wires and supplies power thereto.

Description of Respective Units

Figure 4A:
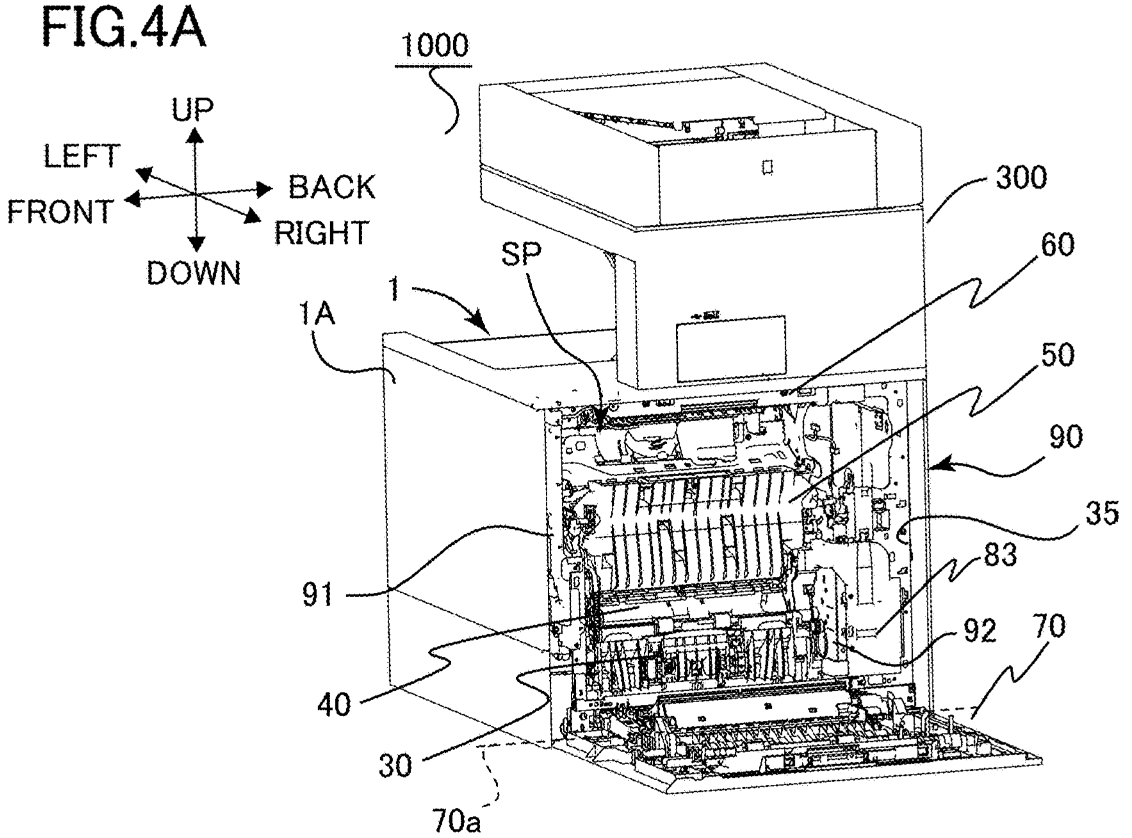
FIG. 4A is a perspective view illustrating a right side face of the printer body.
Figure 4B:
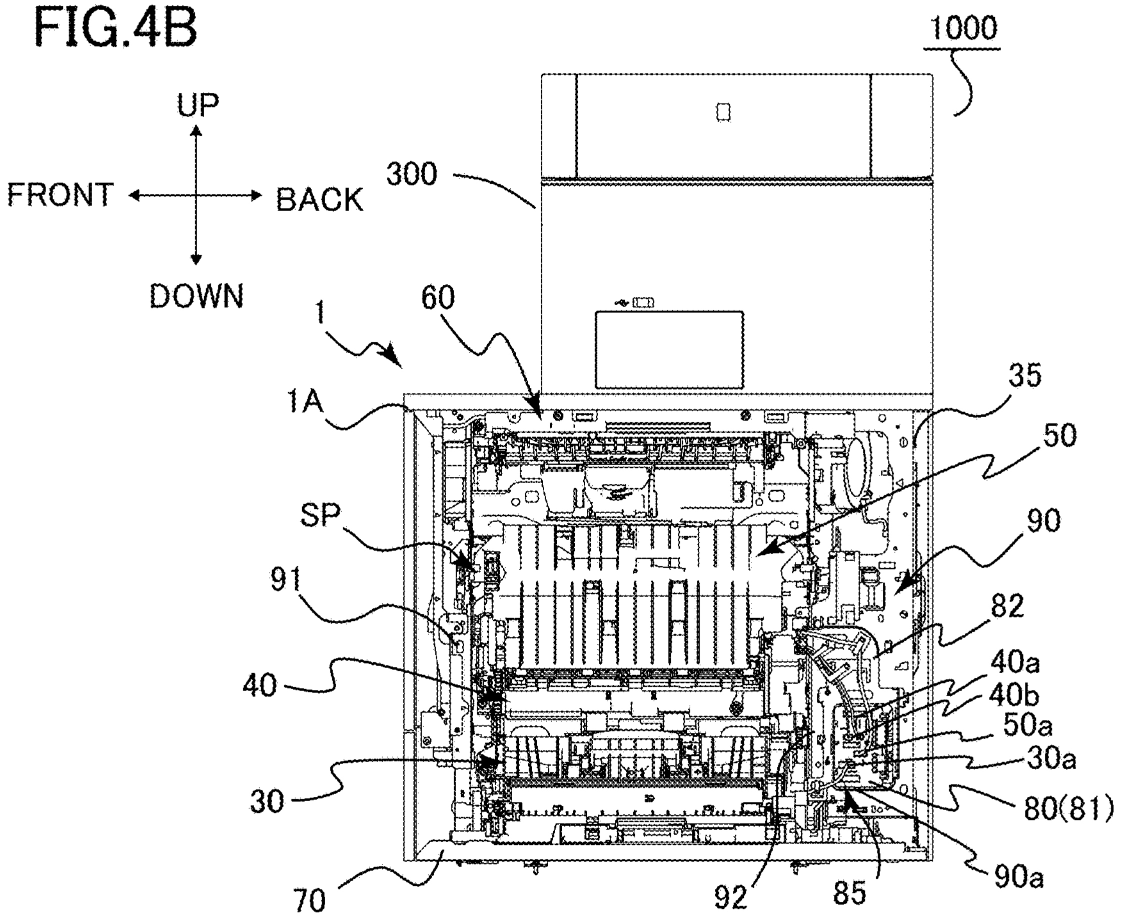
FIG. 4B is a side view illustrating the right side face of the printer body.

Next, the configuration of respective units of the printer body 1 will be described. FIG. 4A is a perspective view illustrating the printer body 1 in a state where a jam removal cover 70 serving as an opening/closing cover is opened, and FIG. 4B is a side view illustrating the printer body 1 in the state where the jam removal cover 70 is opened. The printer body 1 includes a plurality of conveyance units capable of conveying sheets S. Specifically, the printer body 1 includes a sheet feed unit 30, a registration unit 40, a secondary transfer unit 50, and a sheet discharge unit 60 as the plurality of conveyance units, as illustrated in FIGS. 4A and 4B.

The jam removal cover 70 supported in an openable and closable manner about a pivot shaft 70*a* with respect to an apparatus body 1A of the printer body 1 is disposed on a right side face of the printer body 1. The pivot shaft 70*a* extends in a front-back direction. The jam removal cover 70 serving as an opening and closing cover is opened with respect to the apparatus body 1A to thereby expose an opening portion 35 of the apparatus body 1A. Further, the jam removal cover 70 includes a manual feed tray 4 on which sheets are stacked, and a duplex conveyance path not shown through which sheets are passed during duplex printing in which images are formed on both sides of a sheet.

The sheet feed unit 30, the registration unit 40, the secondary transfer unit 50, and the sheet discharge unit 60 described above are detachably attached to the apparatus body 1A through the opening portion 35. In the present embodiment, the apparatus body 1A refers to a portion of the printer body 1 excluding an openable/closable cover such as the jam removal cover 70.

Figure 11A:
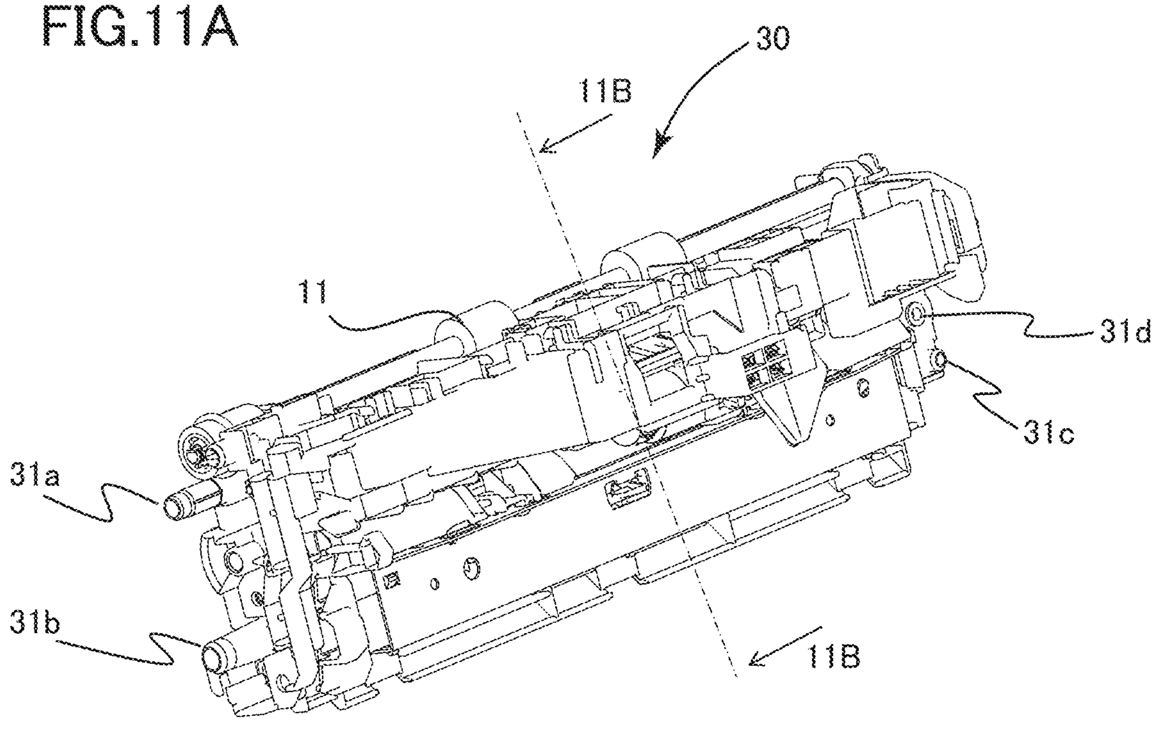
FIG. 11A is a perspective view illustrating a sheet feed unit.
Figure 11B:
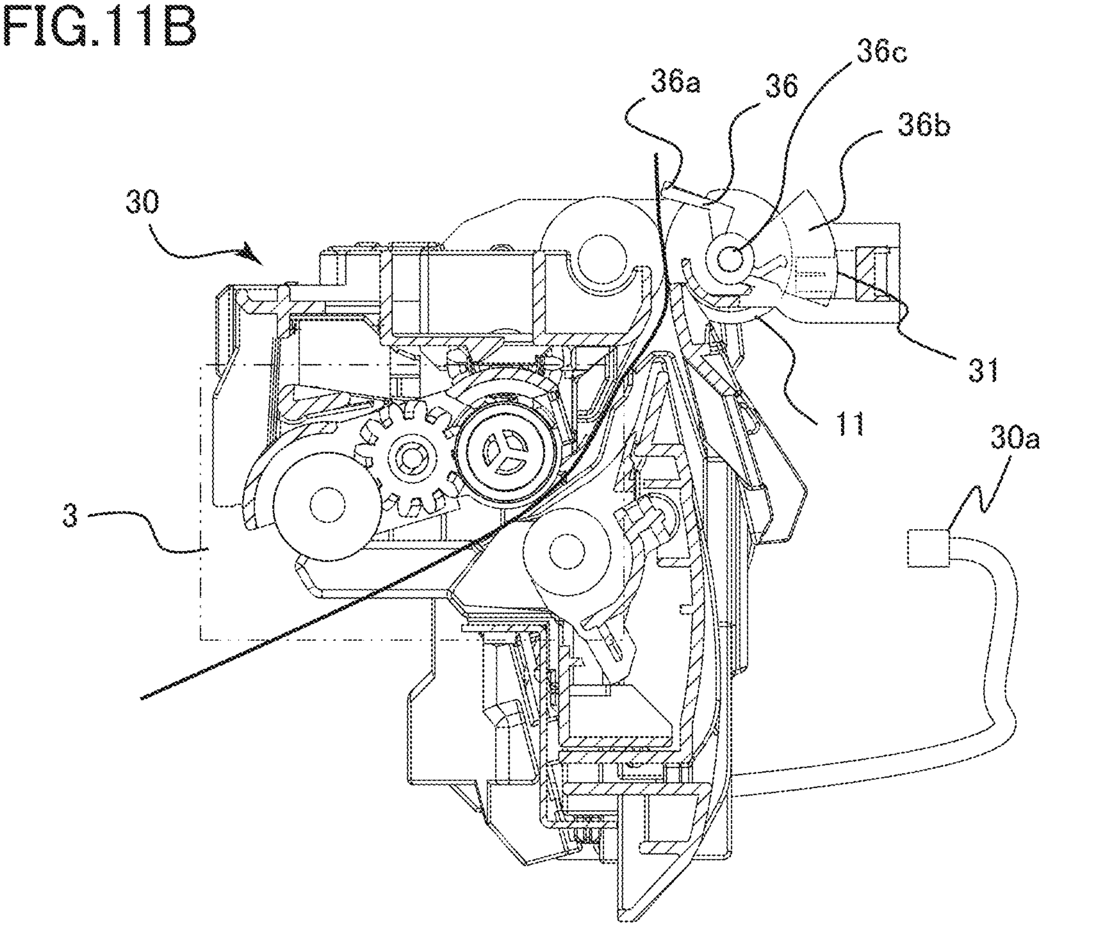
FIG. 11B is a cross-sectional view illustrating a 11B-11B cross-section of FIG. 11A.

The sheet feed unit 30 includes the feeding portion 3 and the intermediate conveyance roller pair 11, as illustrated in FIG. 11B. Further, the sheet feed unit 30 includes a flag member 36 and a leading edge detection sensor 31. The flag member 36 is capable of pivoting about a rotation shaft 36*c* of one of the rollers of the intermediate conveyance roller pair 11, and includes a flag unit 36*a* and a light shielding portion 36*b*. The flag unit 36*a* is arranged in a manner protruding to a conveyance path in a state where the flag member 36 is positioned at a standby position.

In a state where the sheet S fed by the feeding portion 3 presses the flag unit 36*a*, the flag member 36 rotates about the rotation shaft 36*c*, and the light shielding portion 36*b* shields an optical path of the leading edge detection sensor 31. Thereby, the leading edge detection sensor 31 can detect a leading edge of the sheet S being fed.

Figure 8A:
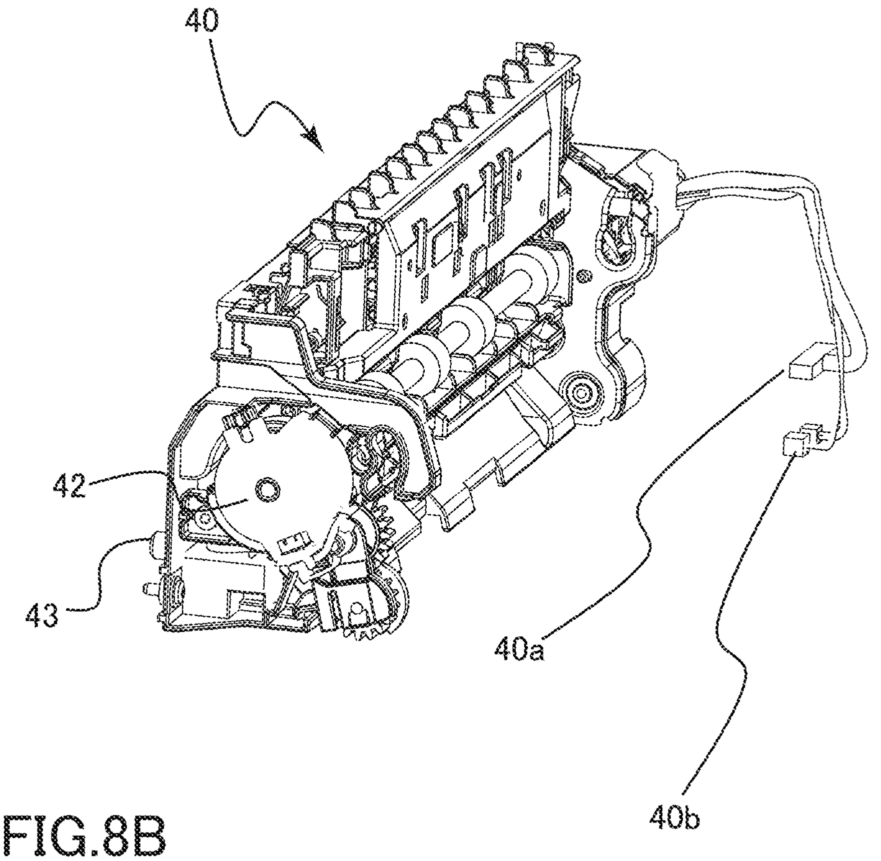
FIG. 8A is a perspective view illustrating a registration unit.
Figure 8B:
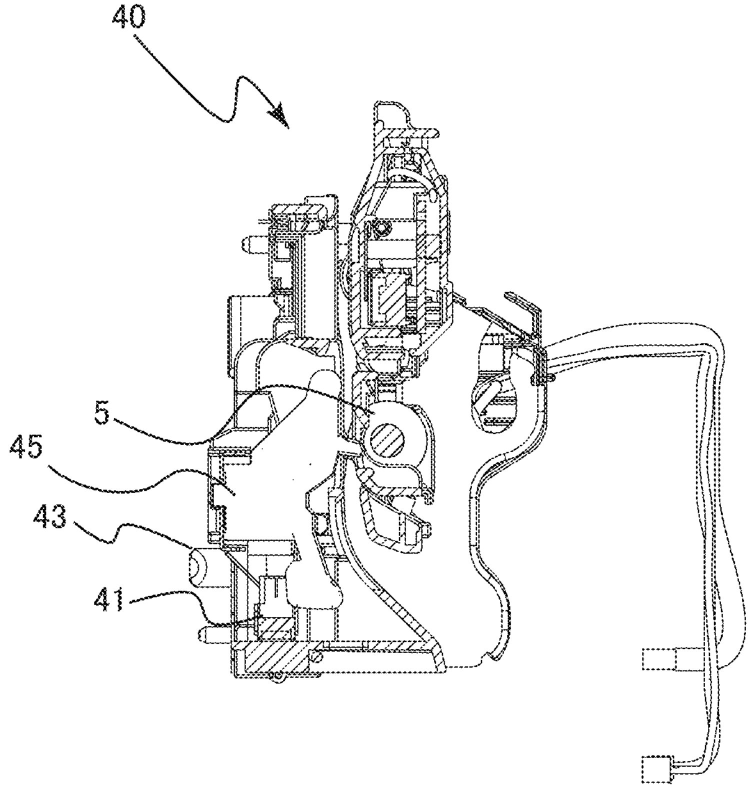
FIG. 8B is a cross-sectional view illustrating the registration unit.

The registration unit 40 is a unit including the registration roller pair 5, as illustrated in FIG. 8B, and includes a flag member 45, a registration sensor 41, and an electromagnetic clutch 42. The flag member 45 shields an optical path of a registration sensor 41 by being pressed by a sheet S being conveyed, similarly as the flag member 36 described above. Thereby, the registration sensor 41 can detect a leading edge of the sheet S being conveyed. The electromagnetic clutch 42 connects or disconnects a drive to the registration roller pair 5 based on a detection result of the registration sensor 41 to thereby rotate or stop the rotation of the registration roller pair 5.

Figure 5A:
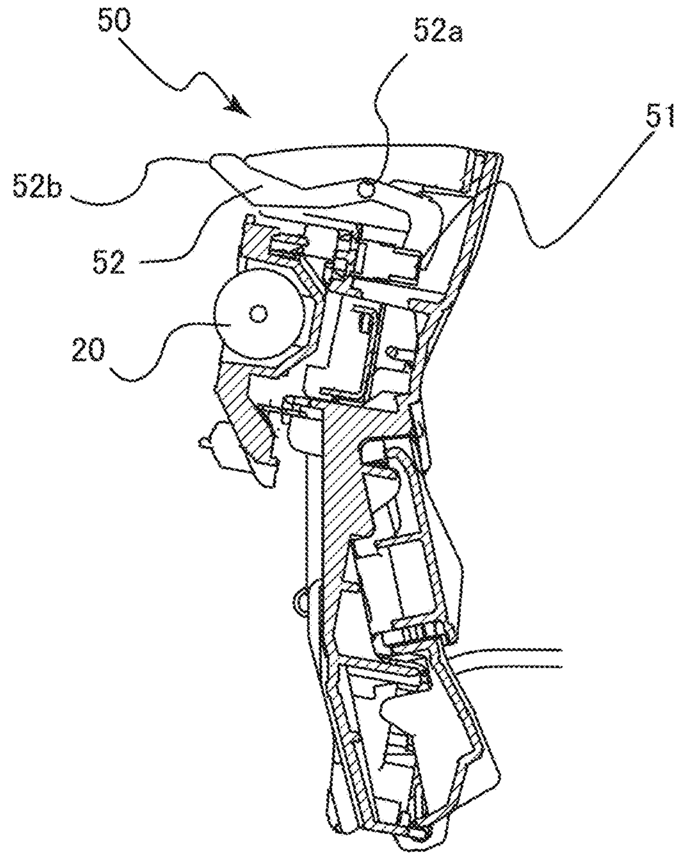
FIG. 5A is a cross-sectional view illustrating a secondary transfer unit.

The secondary transfer unit 50 includes, as illustrated in FIG. 5A, a flag member 52 capable of pivoting about a pivot shaft 52*a*, and a loop sensor 51. The flag member 52 includes a contact portion 52*b* that contacts a sheet surface between the secondary transfer nip T2 and the fixing unit 23. Since the contact portion 52*b* aligns along the sheet surface, the flag member 52 pivots about the pivot shaft 52*a* according to the amount of loop formed to the sheet. In a state where the flag member 52 pivots, the loop sensor 51 turns ON or OFF, and according to the signal of the loop sensor 51, a conveyance speed of the sheet at the secondary transfer nip T2 or a fixing nip of the fixing unit 23 is controlled. Thereby, an amount of loop of the sheet between the secondary transfer nip T2 and the fixing unit 23 is controlled to a predetermined amount.

Figure 14:
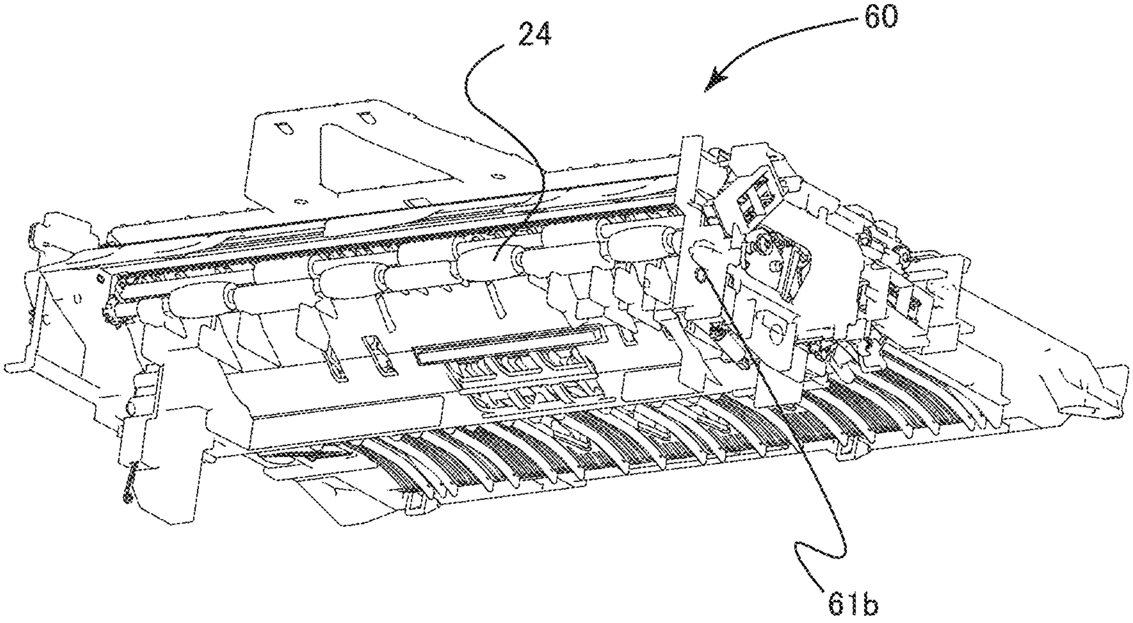
FIG. 14 is a perspective view illustrating a sheet discharge unit.

The sheet discharge unit 60 is a unit including the sheet discharge roller pair 24, and a reverse flapper not shown for switching between discharging the sheet S onto the sheet tray 25 and conveying the sheet S to a duplex reverse conveyance path not shown, as illustrated in FIG. 14. Further, the sheet discharge unit 60 includes an electromagnetic solenoid not shown that switches the position of the reverse flapper or a sheet discharge sensor not shown that senses a leading edge of the sheet.

Relay Board

Next, a relay board 80 disposed on the apparatus body 1A of the printer body 1 and being electrically connected with the controller board 27 will be described with reference to FIGS. 3 to 4B. The apparatus body 1A includes a main body frame 90 having a first side panel 91 and a second side panel 92. The first side panel 91 and the second side panel 92 are each formed in a plate shape that extend in a right-left direction and an up-down direction, and are arranged at different positions in a front-back direction. That is, the first side panel 91 and the second side panel 92 extend along an attachment/detachment direction of the sheet feed unit 30, the registration unit 40, the secondary transfer unit 50, and the sheet discharge unit 60 described later. The second side panel 92 is arranged rearward of the first side panel 91 such that a space SP is formed between the first side panel 91 and the second side panel 92.

Further, the image processing controller 26, the controller board 27, and the power supply device 28 described above are arranged rearward of the second side panel 92. As illustrated in FIG. 4B, a hole portion 90*a* is formed on the main body frame 90, and a support member 82 is fixed to the hole portion 90*a*. The relay board 80 is fixed in a position erected in the up-down direction to the support member 82. That is, the relay board 80 is arranged such that a board surface is arranged along a virtual plane that extends in the front-back direction and the up-down direction. Further, the hole portion 90*a*, the support member 82, and the relay board 80 are arranged rearward of the second side panel 92.

Further, the relay board 80 includes a first surface 81 and a second surface 84 that extend in the front-rear direction and the up-down direction, as illustrated in FIGS. 3 and 4B. In other words, the first surface 81 and the second surface 84 extend along the vertical direction. The first surface 81 is arranged to face rearward and also face the outer side of the printer body 1 through the opening portion 35. In other words, the first surface 81 is disposed to face the jam removal cover 70 in a state closed with respect to the apparatus body 1A. The second surface 84 is arranged to face frontward and also face the inner side of the printer body 1, on the opposite side from the first surface 81.

A plurality of connectors 85 serving as second connectors are provided on the first surface 81 of the relay board 80. The plurality of connectors 85 are connected to sensors, electromagnetic clutches, and electromagnetic solenoids of the sheet feed unit 30, the registration unit 40, the secondary transfer unit 50, and the sheet discharge unit 60 described above through metal bundle wires. The second surface 84 of the relay board 80 has various connectors soldered thereto, and is provided with a flexible flat cable (hereinafter referred to as FFC) connector 87 to be connected to the controller board 27 through an FFC 86 (refer to FIG. 3) serving as a signal wire. The FFC connector 87 constitutes a third connector.

Further, the relay board 80 is configured to be covered by a cover member 83 supported on the main body frame 90, as illustrated in FIG. 4A, such that the user cannot touch the plurality of connectors 85 disposed on the first surface 81 even if the jam removal cover 70 is opened. This configuration enables to prevent the hand of a user charged with static electricity from touching the plurality of connectors 85 and having the static electricity flow through the FFC connector 87 to the controller board 27, causing failure of the controller board 27.

Replacement Procedure of Respective Units

Next, a replacement procedure carried out by a maintenance crew to replace the sheet feed unit 30, the registration unit 40, the secondary transfer unit 50, and the sheet discharge unit 60 serving as a plurality of conveyance units will be described with reference to FIGS. 4A to 16. At first, a maintenance crew opens the jam removal cover 70 with respect to the apparatus body 1A and exposes the opening portion 35 on the right side of the apparatus body 1A, as illustrated in FIG. 4A.

Next, the maintenance crew removes the cover member 83 covering the relay board 80 from the main body frame 90, as illustrated in FIGS. 4A and 4B. Thereby, the plurality of connectors 85 disposed on the first surface 81 of the relay board 80 is exposed through the opening portion 35. That is, at least a part of the first surface 81 of the relay board 80 and the plurality of connectors 85 is arranged at a position overlapped with the opening portion 35 when viewed in the front-rear direction. Hereafter, the replacement procedures of respective units will be described successively.

Replacement Procedure of Secondary Transfer Unit

Figure 5B:
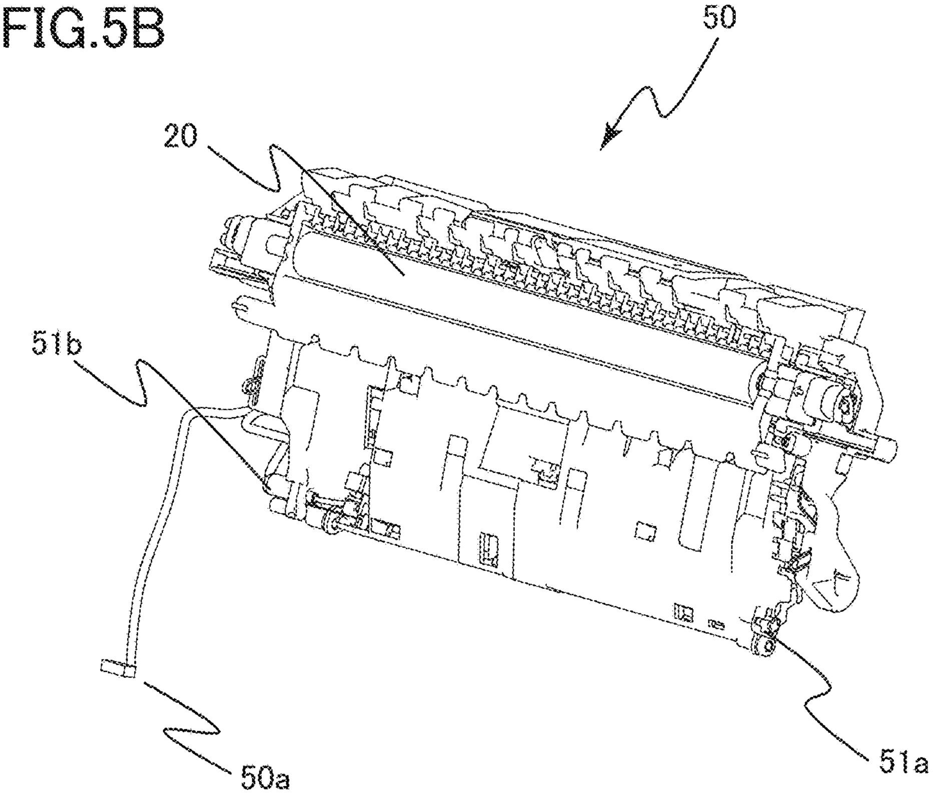
FIG. 5B is a perspective view illustrating the secondary transfer unit.
Figure 6:
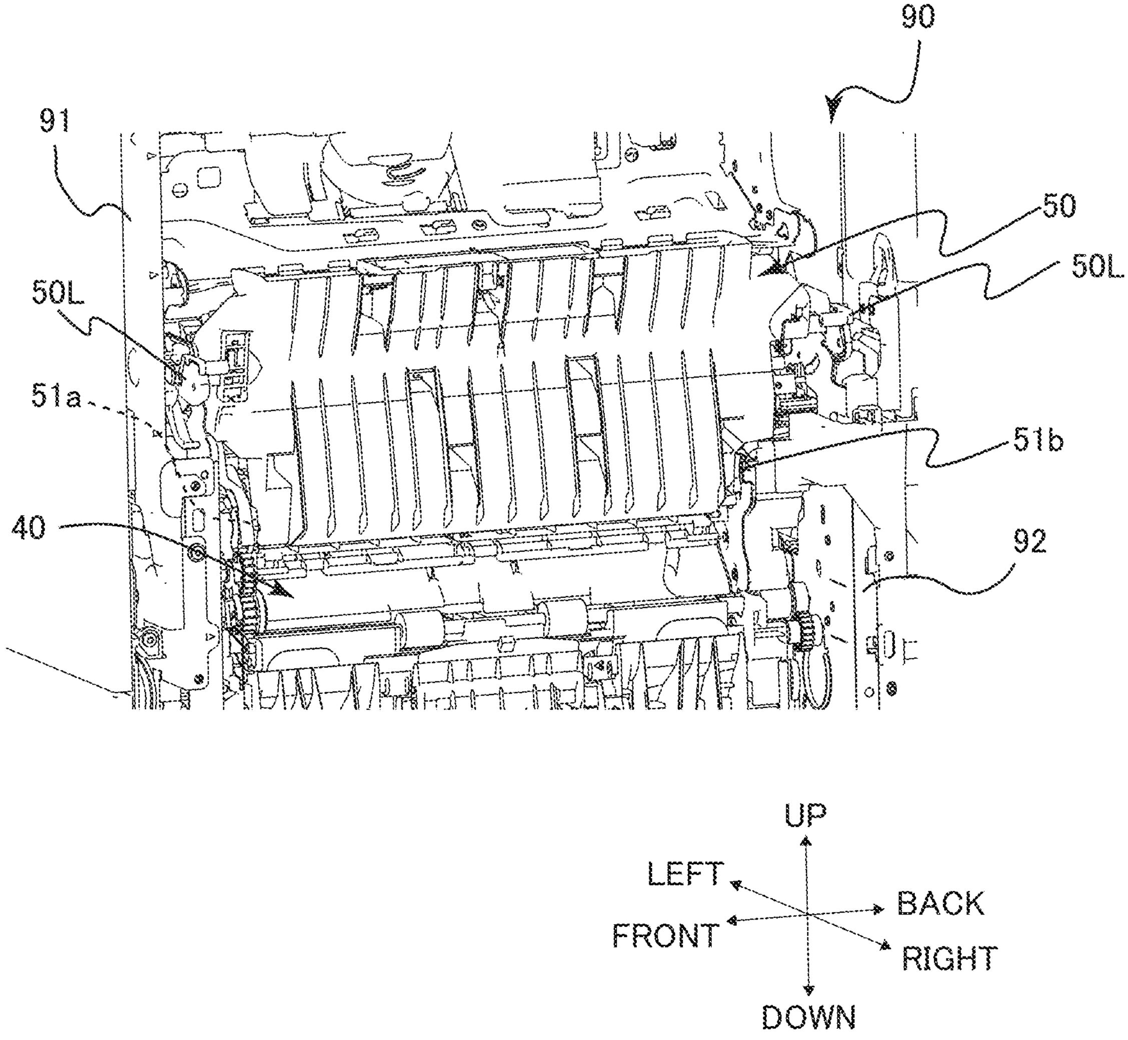
FIG. 6 is a perspective view illustrating the secondary transfer unit in a state attached to the apparatus body.

As illustrated in FIG. 5B, the secondary transfer unit 50 includes support shafts 51*a* and 51*b*, and the support shafts 51*a* and 51*b* extend in parallel with the rotation shaft of the secondary transfer roller 20. The support shafts 51*a* and 51*b* are engaged with engagement holes not shown of the registration unit 40, as illustrated in FIG. 6, and are supported pivotably by the registration unit 40 about the support shafts 51*a* and 51*b*.

The engagement hole to which the support shaft 51*a* is engaged is formed in a tubular shape, and the engagement hole to which the support shaft 51*b* is engaged is formed in an approximately U shape in which one side, such as an upper side, is opened. Further, the secondary transfer unit 50 is urged frontward by a spring not shown in a state supported by the registration unit 40. Thereby, the secondary transfer unit 50 is attached to the registration unit 40 in a state positioned in the front-rear direction. In a state where the jam removal cover 70 is closed, the secondary transfer unit 50 is fixed by locking members 50L and 50L attached to the main body frame 90 such that the secondary transfer roller 20 is in contact with the intermediate transfer unit 15.

In a state where the jam removal cover 70 is opened, the secondary transfer unit 50 pivots about the support shafts 51*a* and 51*b* in a direction separating from the intermediate transfer unit 15 in linkage with an opening movement of the jam removal cover 70. Then, the maintenance crew removes a connector 50*a* serving as a first connector of the secondary transfer unit 50 from the connector 85 of the relay board 80, as illustrated in FIGS. 4B and 5B, and removes the bundle wire wired along the support member 82. Further, the connector 50*a* is connected by a bundle wire to the loop sensor 51, for example.

Figure 7:
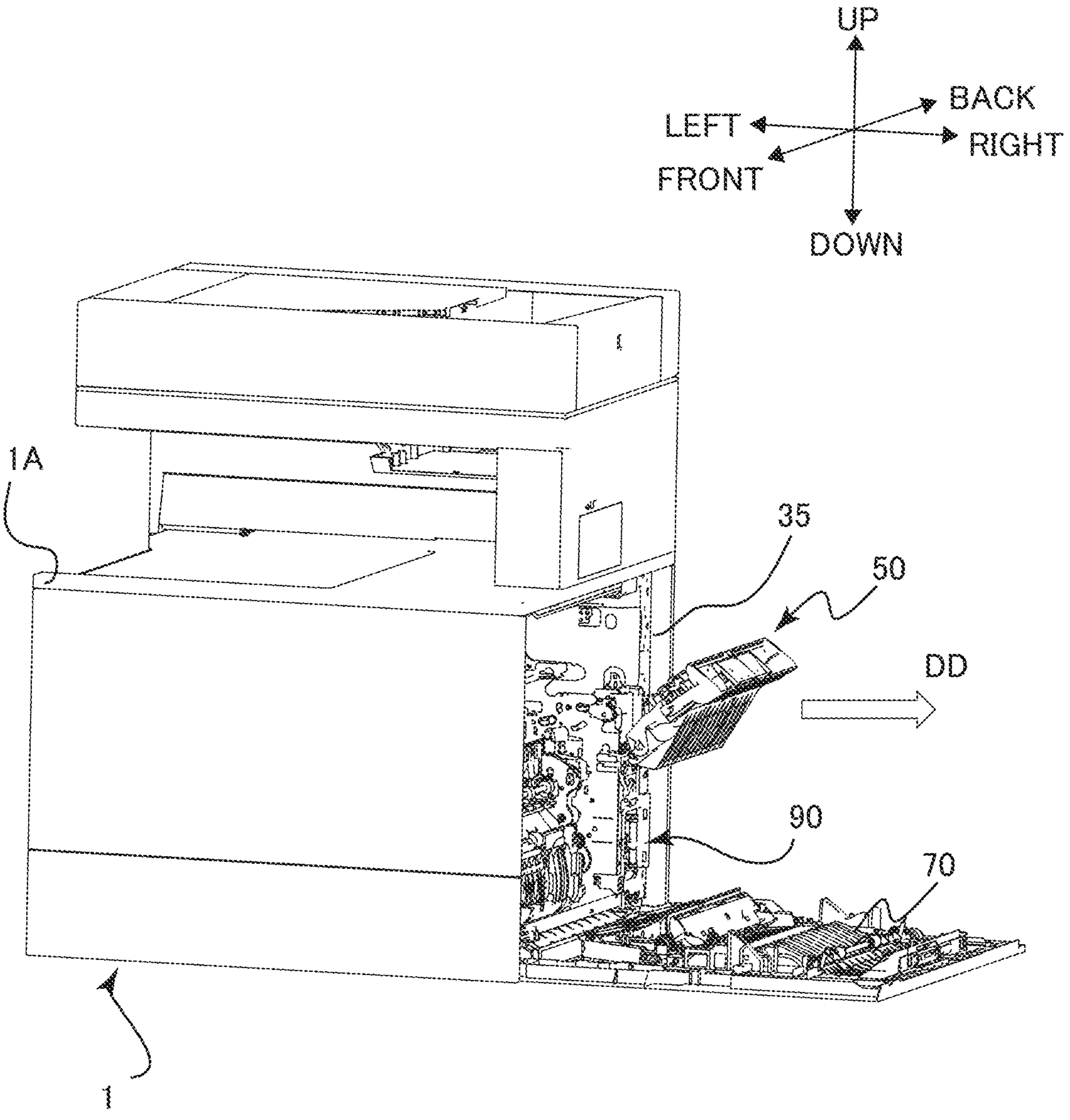
FIG. 7 is a perspective view illustrating a state in which the secondary transfer unit is detached.

The maintenance crew presses the secondary transfer unit 50 rearward against a spring not shown that urges the secondary transfer unit 50 frontward. Thereby, the support shaft 51*a* can be removed from the tubular engagement hole. In this state, by lifting the secondary transfer unit 50 upward, the support shaft 51*b* is removed from the approximately U-shaped engagement hole, and as illustrated in FIG. 7, the secondary transfer unit 50 can be detached in a detachment direction DD through the opening portion 35. Further, by carrying out the above-described procedure in the opposite order, the secondary transfer unit 50 can be attached to the apparatus body 1A. Further, the detachment direction DD is a direction along a right direction according to the present embodiment.

Replacement Procedure of Registration Unit

Figure 9:
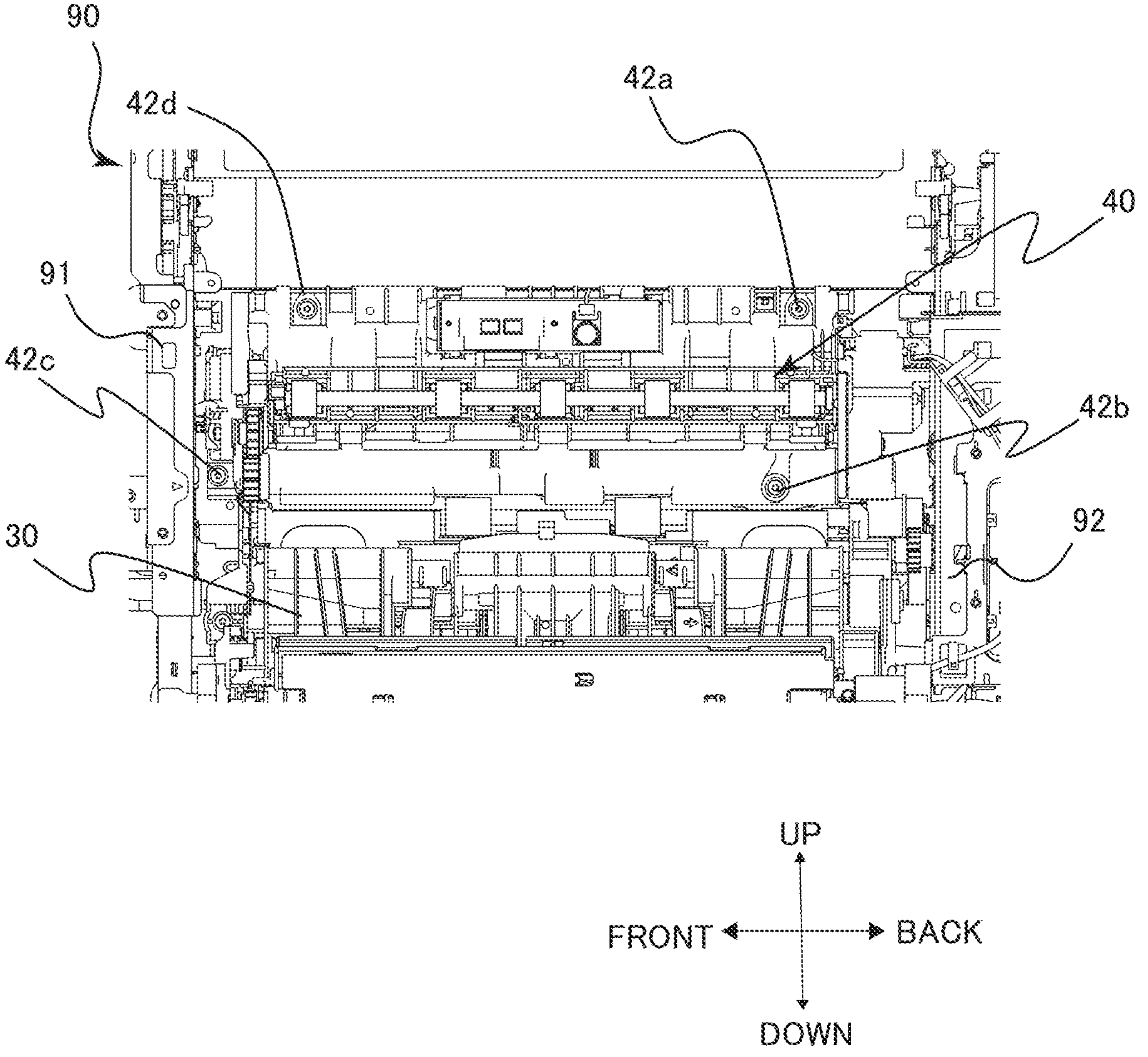
FIG. 9 is a front view illustrating the registration unit in a state attached to a main body frame.

As illustrated in FIGS. 8B and 9, the registration unit 40 includes a positioning boss 43, and four screw fastening portions 42*a*, 42*b*, 42*c*, and 42*d*. The positioning boss 43 engages with the main body frame 90 and positions the registration unit 40 in the front-rear direction and the up-down direction with respect to the main body frame 90. In this state, the registration unit 40 is fixed to the main body frame 90 by having the screw fastening portions 42*a*, 42*b*, 42*c*, and 42*d* fastened to the main body frame 90 by screws.

When removing the registration unit 40 from the main body frame 90, the maintenance crew removes connectors 40*a* and 40*b* of the registration unit 40 from the connectors 85 of the relay board 80, as illustrated in FIG. 4B and FIGS. 8A to 9. Then, the maintenance crew removes the bundle wires wired along the support member 82, and removes the four screws fastened to the screw fastening portions 42*a*,

42*b*, 42*c*, and 42*d* by screws. Further, the connectors 40*a* and 40*b* serving as first connectors are connected via bundles wires to the registration sensor 41, for example.

Figure 10:
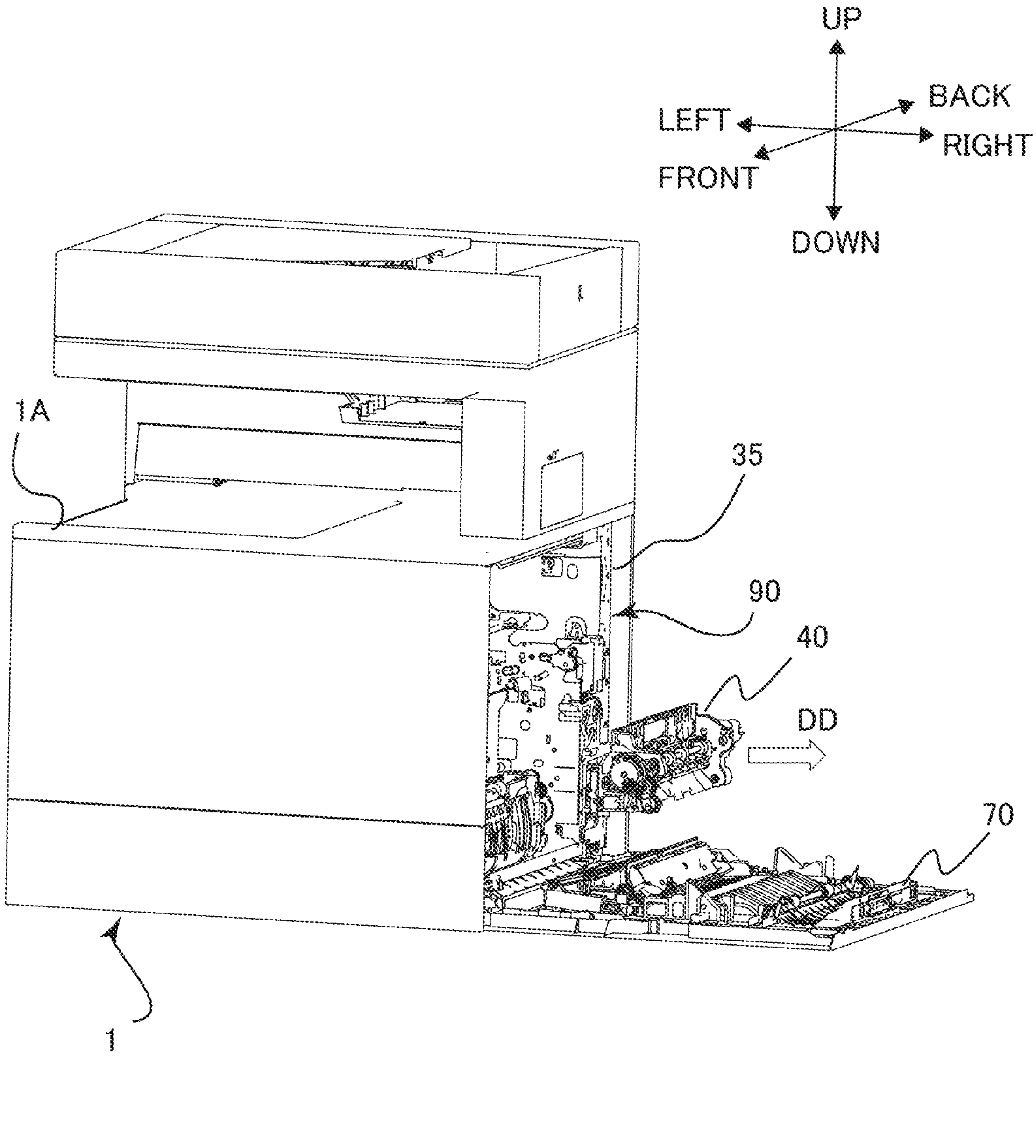
FIG. 10 is a perspective view illustrating a state in which the registration unit is detached.

Further, the maintenance crew can remove the registration unit 40 through the opening portion 35 from the main body frame 90 by drawing out the registration unit 40 from the main body frame 90 in the detachment direction DD, as illustrated in FIG. 10. Further, by carrying out the above-described procedure in the opposite order, the registration unit 40 can be attached to the main body frame 90.

Replacement Procedure of Sheet Feed Unit

FIG. 11A is a perspective view illustrating the sheet feed unit 30, and FIG. 11B is a cross-sectional view illustrating a 11B-11B cross-section of FIG. 11A. As illustrated in FIG. 11A, the sheet feed unit 30 includes positioning bosses 31*a*, 31*b*, and 31*c*, and a screw fastening portion 31*d*. In a state where the sheet feed unit 30 is attached to the main body frame 90, the positioning boss 31*c* and the screw fastening portion 31*d* are disposed on a front portion of the sheet feed unit 30, and the positioning bosses 31*a* and 31*b* are disposed on a rear portion of the sheet feed unit 30. The positioning bosses 31*a* and 31*b* are extended in parallel with the rotation shaft of the intermediate conveyance roller pair 11.

Figure 12:
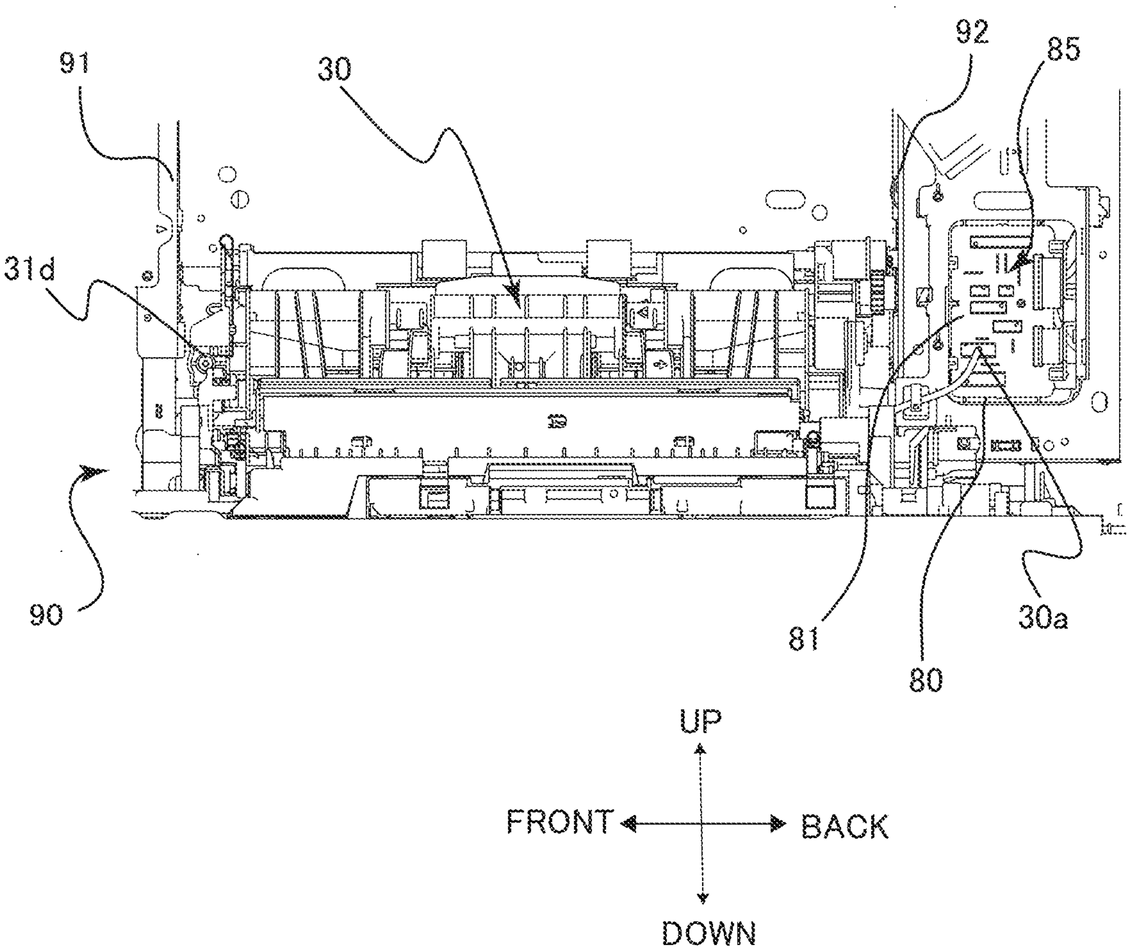
FIG. 12 is a front view illustrating the sheet feed unit in a state attached to the main body frame.

The positioning bosses 31*a* and 31*b* of the sheet feed unit 30 engages with the second side panel 92 of the main body frame 90, as illustrated in FIGS. 11A and 12. Thereby, the sheet feed unit 30 is positioned in the up-down direction and the right-left direction with respect to the main body frame 90. Further, the positioning boss 31*c* of the sheet feed unit 30 is engaged with the first side panel 91 of the main body frame 90. Thereby, the sheet feed unit 30 is positioned in the front-rear direction with respect to the main body frame 90. In this state, the sheet feed unit 30 is fixed to the main body frame 90 by fastening the screw fastening portion 31*d* onto the main body frame 90 by screws.

When removing the sheet feed unit 30 from the main body frame 90, the maintenance crew removes a connector 30*a* of the sheet feed unit 30 from the connectors 85 of the relay board 80, as illustrated in FIG. 4B and FIGS. 11A to 12. Then, the maintenance crew removes the bundle wire that is wired along the support member 82, and removes the screw fastened to the screw fastening portion 31*d*. Further, the connector 30*a* serving as a first connector is connected by a bundle wire to the leading edge detection sensor 31, for example.

Next, the maintenance crew draws out the positioning boss 31*c* from the positioning hole while rotating the positioning boss 31*c* about a rear side of the sheet feed unit 30 to draw out the positioning boss 31*c* from the positioning hole on the first side panel 91. Next, the maintenance crew removes the positioning bosses 31*a* and 31*b* from the second side panel 92 by moving the sheet feed unit 30 frontward.

Figure 13:
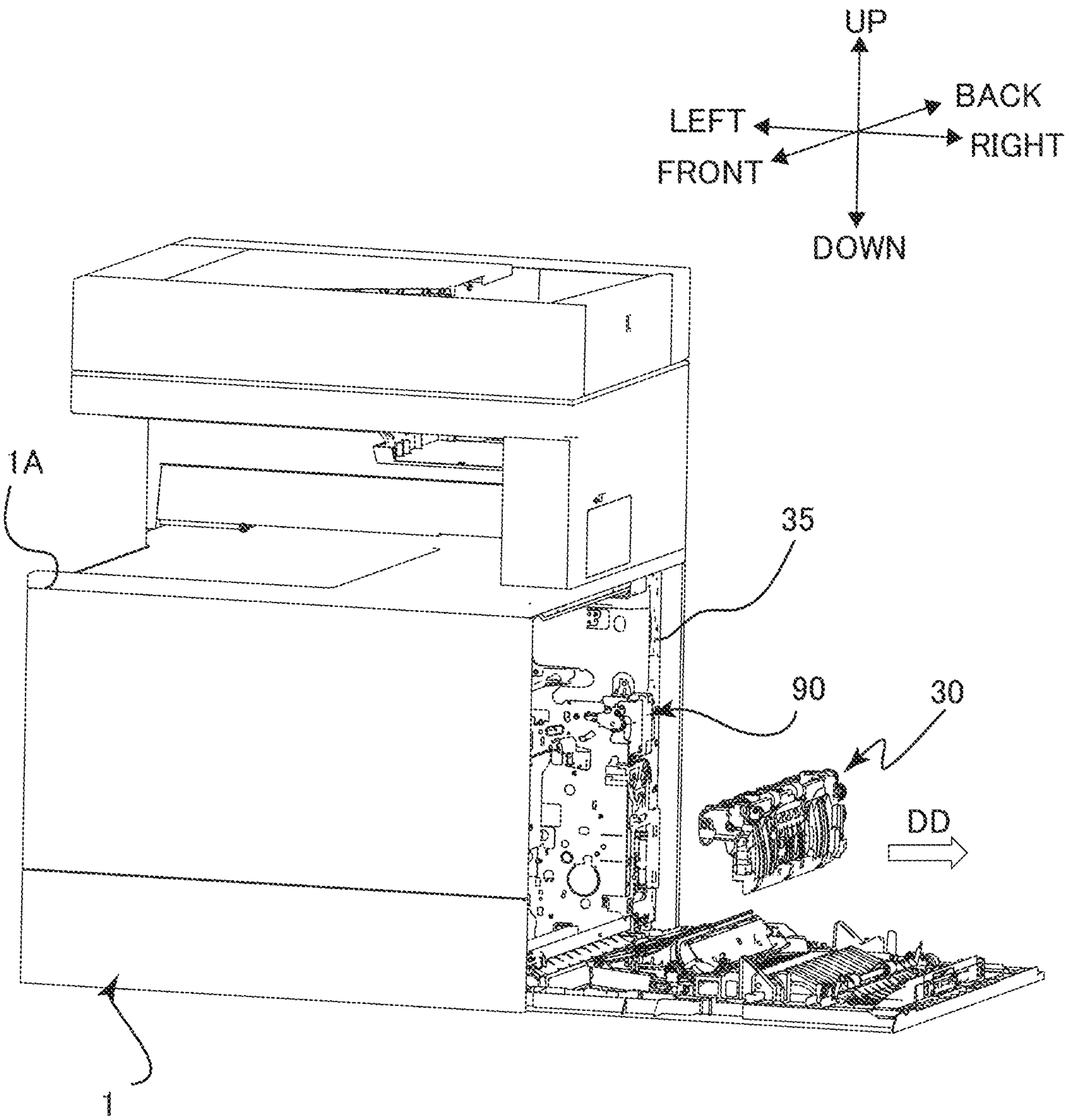
FIG. 13 is a perspective view illustrating a state in which the sheet feed unit is detached.

Then, the maintenance crew can remove the sheet feed unit 30 from the main body frame 90 through the opening portion 35 by drawing out the sheet feed unit 30 in the detachment direction DD from the main body frame 90, as illustrated in FIG. 13. By carrying out the above-described procedure in the opposite order, the sheet feed unit 30 can be attached to the main body frame 90.

Replacement Procedure of Sheet Discharge Unit

As illustrated in FIG. 14, the sheet discharge unit 60 includes a positioning portion 61*a* (not shown) and a positioning portion 61*b* that extend in the left direction. By having the positioning portions 61*a* and 61*b* fit to the main body frame 90, the sheet discharge unit 60 is positioned in the up-down direction and the front-rear direction with respect to the main body frame 90. Thereby, by having four screw fastening portions 62*a*, 62*b*, 62*c*, and 62*d* fastened to the main body frame 90 by screws, as illustrated in FIG. 15, the sheet discharge unit 60 is fixed to the main body frame 90.

Figure 15:
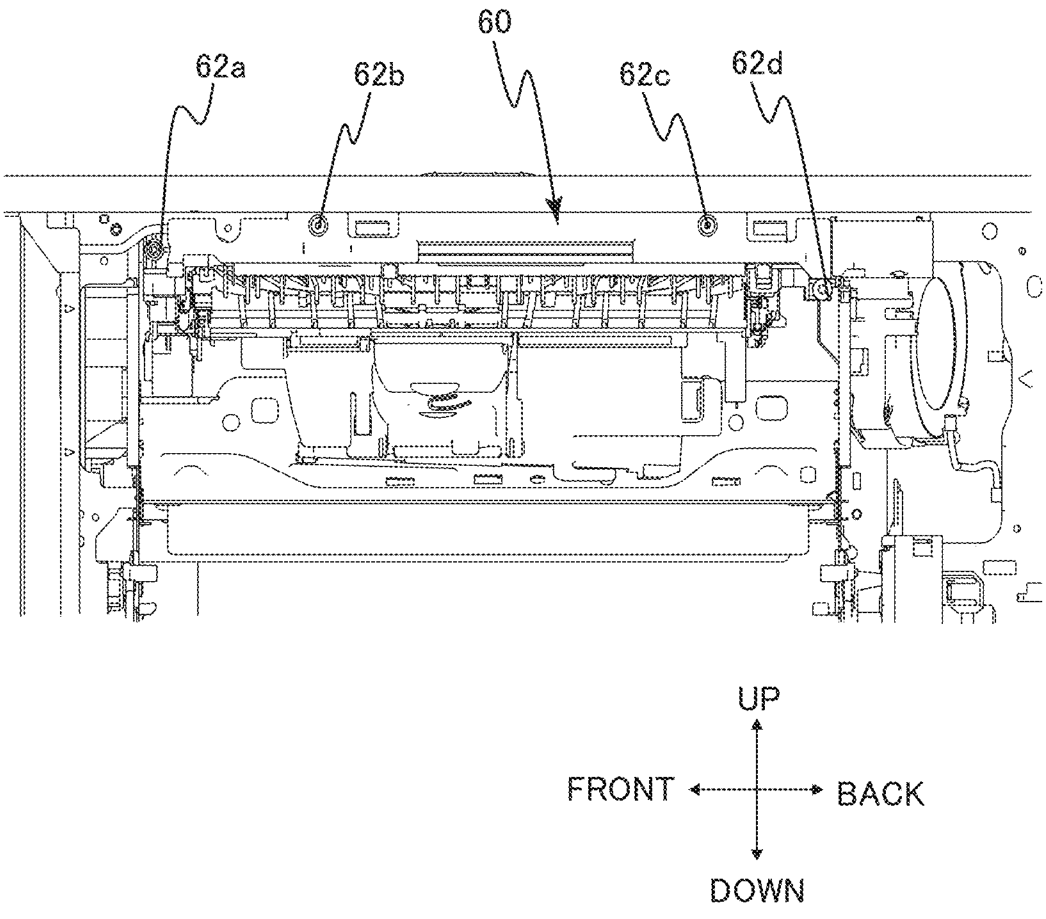
FIG. 15 is a front view illustrating a sheet discharge unit in a state attached to the main body frame.

When removing the sheet discharge unit 60 from the main body frame 90, the maintenance crew removes the bundle wire of the sheet discharge unit 60 from the connectors 85 of the relay board 80, as illustrated in FIG. 4B and FIGS. 14 and 15. Next, the maintenance crew removes the four screws fastened to the screw fastening portions 62*a*, 62*b*, 62*c*, and 62*d*.

Figure 16:
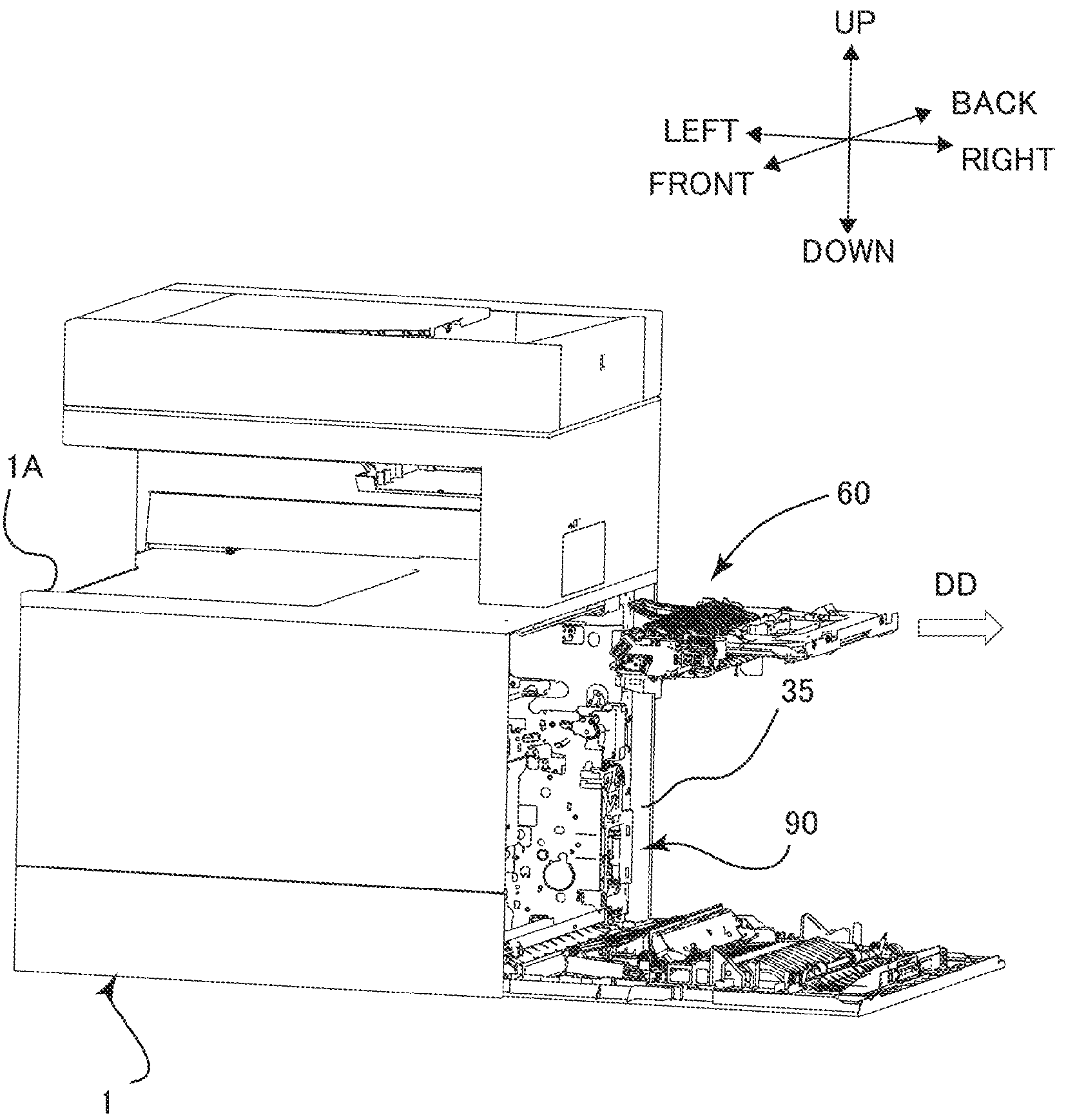
FIG. 16 is a perspective view illustrating a state in which the sheet discharge unit is detached.

Next, the maintenance crew can remove the sheet discharge unit 60 from the main body frame 90 through the opening portion 35 by drawing out the sheet discharge unit 60 in the detachment direction DD from the main body frame 90, as illustrated in FIG. 16. By carrying out the above-described procedure in the opposite order, the sheet discharge unit 60 can be attached to the main body frame 90.

As described above, the sheet feed unit 30, the registration unit 40, the secondary transfer unit 50, and the sheet discharge unit 60 serving as the plurality of conveyance units can be accessed by opening the jam removal cover 70. Further, the relay board 80 can be accessed by opening the jam removal cover 70 and the cover member 83.

A plurality of connectors 85 are disposed on the first surface 81 of the relay board 80, and the first surface 81 and the plurality of connectors 85 are arranged to face the opening portion 35. In other words, the maintenance crew can easily access the plurality of connectors 85. Therefore, the plurality of connectors 85 can be attached and detached easily with the respective connectors disposed on the sheet feed unit 30, the registration unit 40, the secondary transfer unit 50, and the sheet discharge unit 60, such that the maintenance property can be improved.

Further, the sheet feed unit 30, the registration unit 40, the secondary transfer unit 50, and the sheet discharge unit 60 can be arranged in the space SP between the first side panel 91 and the second side panel 92 of the main body frame 90. Meanwhile, the relay board 80 is arranged on a rear side of the second side panel 92, that is, on an opposite side from the first side panel 91 across the second side panel 92. The sheet feed unit 30, the registration unit 40, the secondary transfer unit 50, and the sheet discharge unit 60 are attached and detached in parallel to the detachment direction DD, which is the right direction in the present embodiment. Therefore, the relay board 80 is arranged at a position not interfering with attachment/detachment loci of attaching and detaching the sheet feed unit 30, the registration unit 40, the secondary transfer unit 50, and the sheet discharge unit 60 to and from the main body frame 90. Therefore, the sheet feed unit 30, the registration unit 40, the secondary transfer unit 50, and the sheet discharge unit 60 can be attached to and detached from the main body frame 90 easily, such that the maintenance property can be improved.

Further, a configuration is realized such that the operation of fastening screws to the sheet feed unit 30, the registration unit 40, the secondary transfer unit 50, and the sheet discharge unit 60 with respect to the main body frame 90 or the operation of attaching or detaching units can be completed through operations performed only from the opening portion 35 side. Therefore, there is no need to remove exterior covers other than the jam removal cover 70, such that the maintenance property can be improved.

Further, the relay board 80 has a plurality of connectors 85 provided on the first surface 81, and the FFC connector 87 is disposed on the second surface 84 opposite to the first surface 81. The FFC connector 87 is connected to the controller board 27 by the FFC 86. As described, by disposing connectors on either side of the relay board 80, wiring with the respective conveyance units and the controller board 27 can be simplified, and space can be saved. Further, the first surface 81 and the second surface 84 are extended in the vertical direction, and a wide area of the first surface 81 can be provided when accessing the first surface 81 from the opening portion 35. Therefore, a large number of connectors can be disposed on the first surface 81, such that one relay board 80 can be used to connect to a plurality of conveyance units.

Further, the above configuration assumes that a double-side board capable of having elements mounted on both sides of the board is adopted as the relay board 80, but a more cost-saving single-side board can be adopted instead. If a single-side board is adopted, the plurality of connectors 85 and the FFC connector 87 can be disposed on the first surface 81. According to this configuration, the wiring arrangement becomes complex but the costs related to the board can be reduced compared to the configuration in which the double-side board is adopted.

Figure 17:
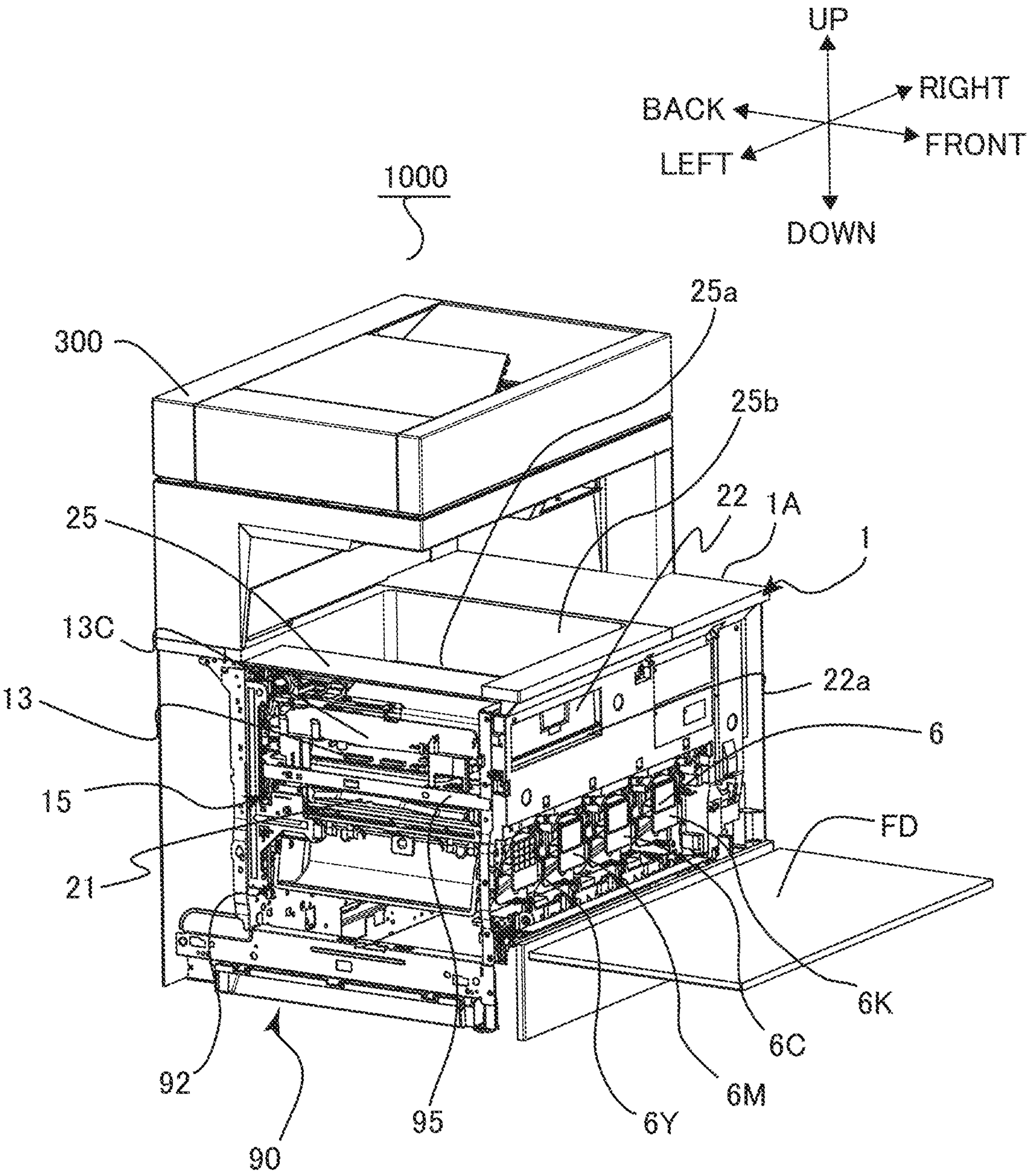
FIG. 17 is a perspective view illustrating a left side face and a front face of the printer body.
Figure 18:
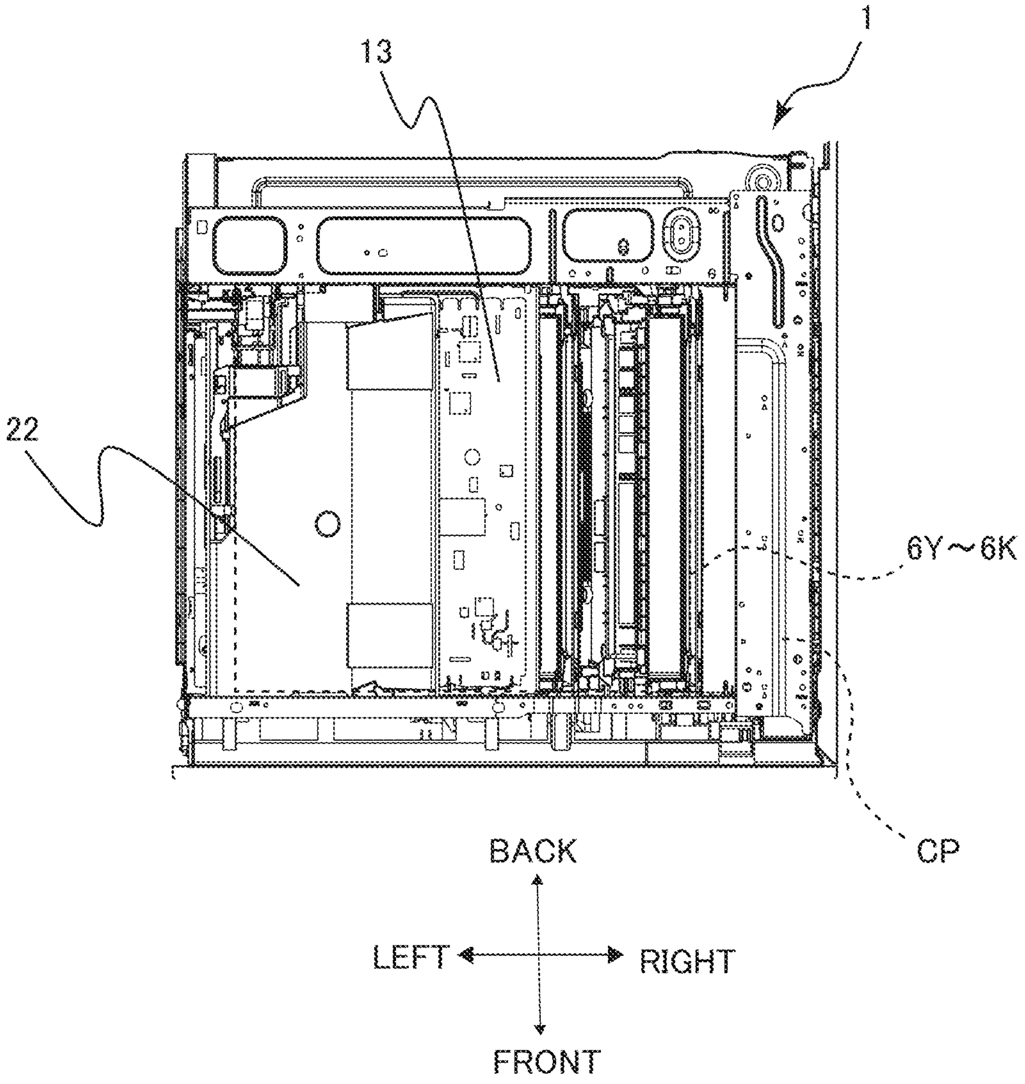
FIG. 18 is a top view illustrating the printer body in a vertical direction.
Figure 19:
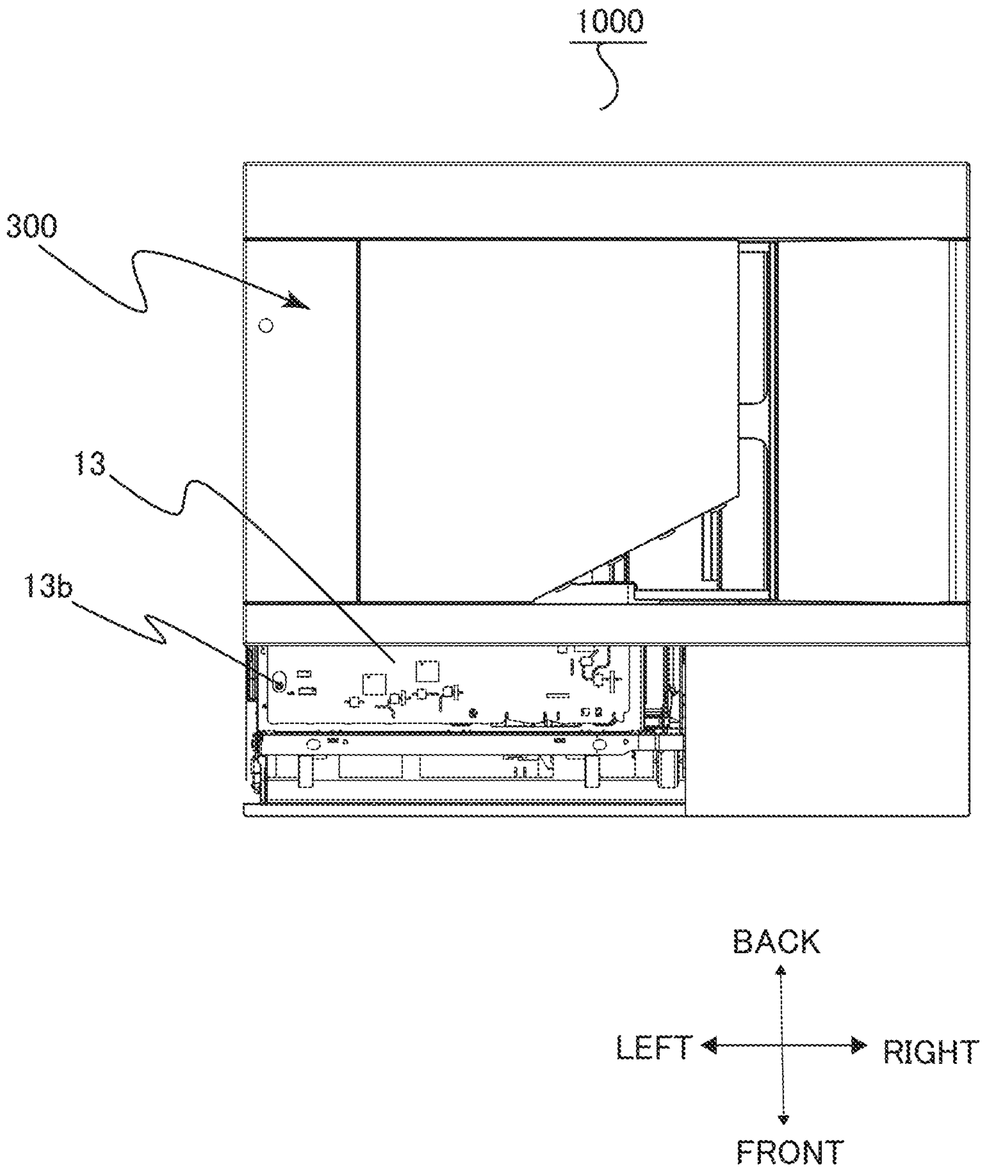
FIG. 19 is a top view illustrating the image forming apparatus in a vertical direction.
Figure 20:
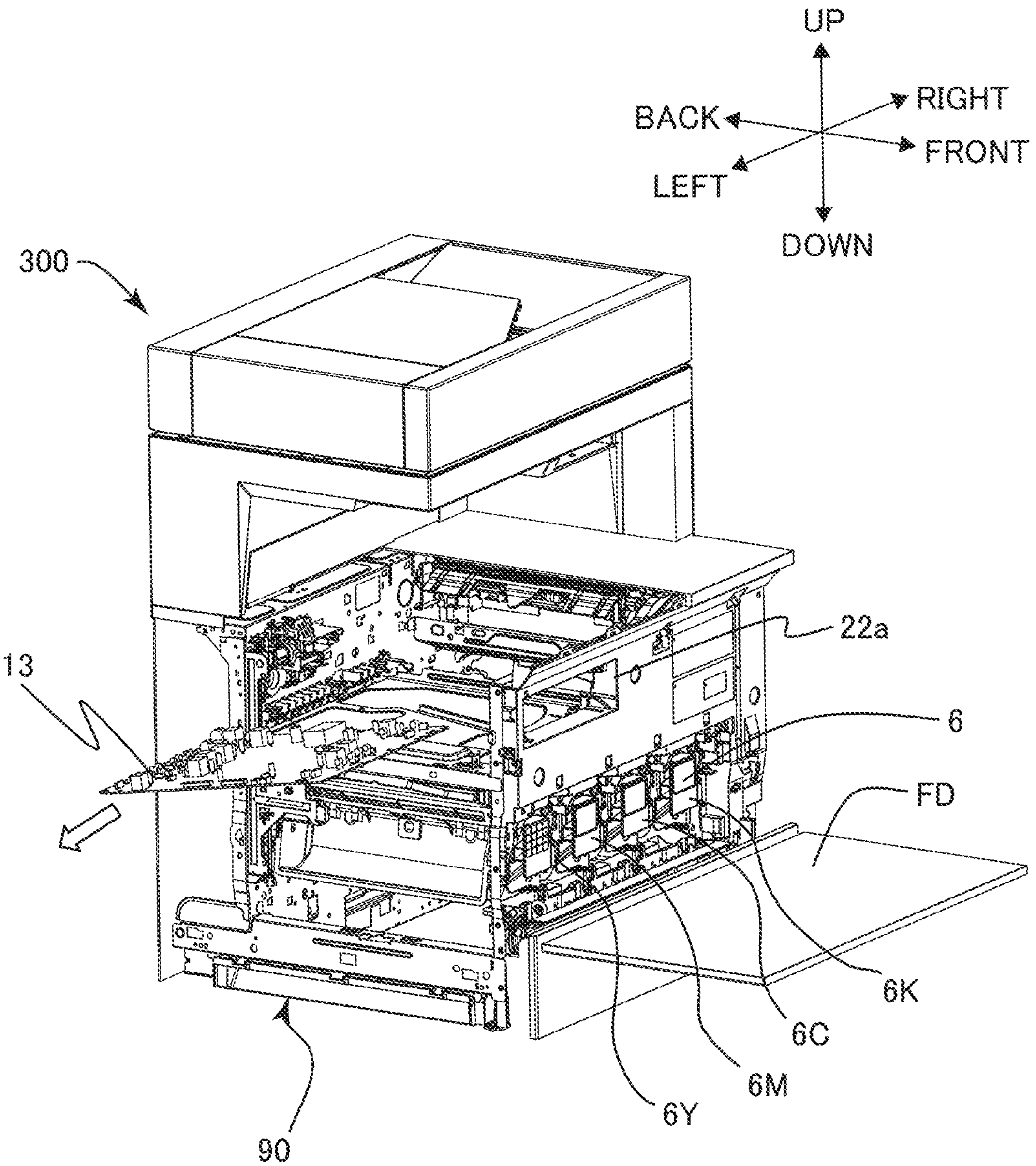
FIG. 20 is a perspective view illustrating a state in which a high-voltage power supply board is detached.

Arrangement of High-Voltage Power Supply Board, Toner Collecting Container, and Intermediate Transfer Unit Next, the arrangement of the high-voltage power supply board 13, the toner collecting container 22, and the intermediate transfer unit 15 will be described in detail with reference to FIG. 2 and FIGS. 17 to 19. FIG. 17 is a perspective view illustrating the image forming apparatus 1000 in a state where the front door FD is opened and the exterior cover on the left side of the printer body 1 is removed. FIG. 18 is a top view in which the printer body 1 is viewed in the vertical direction. FIG. 19 is a top view in which the image forming apparatus 1000 is viewed in the vertical direction. In FIG. 17, the feeder 100 and the large capacity sheet feed deck 200 are not shown. Further, in FIG. 18, the sheet tray 25 and a cover member 13C are not shown.

As illustrated in FIGS. 2 and 17, the main body frame 90 includes a metal stay 95 that connects the first side panel 91 to the second side panel 92, and the metal stay 95 is arranged above the intermediate transfer unit 15. The high-voltage power supply board 13 is arranged above the metal stay 95. By arranging the metal stay 95 between the intermediate transfer unit 15 and the high-voltage power supply board 13, it becomes possible to prevent the user from erroneously touching the high-voltage power supply board 13 in a state where the process cartridge or the intermediate transfer unit 15 is removed from the main body frame 90. The high-voltage power supply board 13 is arranged such that a board surface is arranged approximately in parallel with a plane composed of the photosensitive drums of the four process cartridges 6Y, 6M, 6C, and 6K.

The cover member 13C is disposed above the high-voltage power supply board 13 so as to cover the high-voltage power supply board 13, wherein the cover member 13C serving as a power supply cover is fixed to the main body frame 90 and the high-voltage power supply board 13 via hooks, for example. Further, the toner collecting container 22 is arranged above the cover member 13C. The toner collecting container 22 is mounted on an upper surface of the cover member 13C and capable of moving in the front-rear direction along a rail disposed on the cover member 13C.

The front door FD is supported in an openable and closable manner on a front portion of the apparatus body 1A of the printer body 1. By opening the front door FD, an opening portion 22*a* on a front side of the apparatus body 1A is opened, allowing access to the process cartridges 6Y, 6M, 6C, and 6K. The process cartridges 6Y, 6M, 6C, and 6K can be attached to and detached from the main body frame 90 in the front-rear direction. Further, the user and the maintenance crew can remove the toner collecting container 22 from the main body frame 90 through the opening portion 22*a*. The cover member 13C covers an upper part of the high-voltage power supply board 13, and is configured to prevent the user from touching the high-voltage power supply board 13 even in a state where the toner collecting container 22 is removed from the main body frame 90.

The sheet tray 25 is disposed on an upper portion of the printer body 1, and the sheet tray 25 includes an inclined surface 25*a* that is inclined to be higher as it goes downstream in the discharge direction of the sheet discharge roller pair 24, and an abutment surface 25*b*. Therefore, the sheet being discharged onto the sheet tray 25 by the sheet discharge roller pair 24 slides down along the inclined surface 25*a* and is aligned in the discharge direction by having the trailing edge thereof abut against the abutment surface 25*b*. Thereby, the stacking ability of sheets on the sheet tray 25 can be improved, and it becomes easy for users to remove the bundle of sheets being discharged.

Since the sheet tray 25 has the inclined surface 25*a*, a space is formed between the sheet tray 25 and the high-voltage power supply board 13. At least a portion of the toner collecting container 22 is arranged to be accommodated in this space.

The cleaning unit 21 provided in the intermediate transfer unit 15 is arranged in a vicinity of the tension roller 14. Toner remaining on the intermediate transfer belt 17 and collected by the cleaning unit 21 is conveyed upward toward the toner collecting container 22 by a toner conveyance unit 29. The toner conveyance unit 29 includes a screw for conveying the toner upward, and a gear for driving the screw to rotate. The toner conveyance unit 29 is arranged so as to straddle over the high-voltage power supply board 13 in the vertical direction so as to convey toner from the intermediate transfer unit 15 to the toner collecting container 22.

In FIG. 18, an area in which the process cartridges 6Y, 6M, 6C, and 6K are arranged is indicated by broken lines. At least a portion of the high-voltage power supply board 13 is arranged so as to overlap with the process cartridges 6Y, 6M, 6C, and 6K in top view. Further, the high-voltage power supply board 13 is arranged on an opposite side from a sheet conveyance path CP, that is, at a position biased to the left side of the printer body 1.

Further, as illustrated in FIG. 19, a screw fastening portion 13*b* is disposed on the high-voltage power supply board 13, wherein the screw fastening portion 13*b* serving as a fixing portion is arranged on a front left side of the printer body 1. The high-voltage power supply board 13 is fixed to the main body frame 90 by having the screw fastening portion 13*b* fixed to the metal stay 95 by screws serving as fixing tools. The method for fixing the high-voltage power supply board 13 to the main body frame 90 is not limited to the fixing method using screws. Further, the high-voltage power supply board 13 can be fixed not only to the metal stay 95 but to any position of the main body frame 90.

Replacement Procedure of High-Voltage Power Supply Board

Next, a replacement procedure of the high-voltage power supply board 13 will be described with reference to FIG. 2 and FIGS. 17 to 20. At first, the maintenance crew opens the front door FD and removes the toner collecting container 22 frontward from the main body frame 90. Next, the maintenance crew removes the exterior cover on the left side face of the printer body 1. By removing the exterior cover, a connector portion connecting the high-voltage power supply board 13 with various electric boards not shown is exposed.

Next, the maintenance crew removes the sheet tray 25. The sheet tray 25 is fixed to the main body frame 90 by screws. The maintenance crew removes all the screws and draws out the sheet tray 25 in a left direction.

Next, the maintenance crew removes the cover member 13C that covers an upper part of the high-voltage power supply board 13. After removing the cover member 13C, the maintenance crew removes all the connectors connected to the respective connector portions of the high-voltage power supply board 13, and removes the screws fastened to the screw fastening portion 13*b* illustrated in FIG. 19.

In this state, as illustrated in the present embodiment, in a state where the image reading portion 300 is attached to the upper part of the printer body 1, the maintenance crew may perform a replacement operation of the high-voltage power supply board 13. As described above, the screw fastening portion 13*b* of the high-voltage power supply board 13 is arranged on a front left portion of the printer body 1. It is preferable to have a space formed on the front left portion of the sheet tray 25 when removing the sheets discharged onto the sheet tray 25. Therefore, also according to the present embodiment, as illustrated in FIG. 19, the front left portion of the printer body 1 is configured so as not to overlap with the image reading portion 300 when the image forming apparatus 1000 is viewed from above.

Further, the screw fastening portion 13*b* for fastening the high-voltage power supply board 13 to the metal stay 95 is arranged so as not to overlap with the image reading portion 300 in top view. In other words, a work space for removing screws fastened to the screw fastening portion 13*b* is provided directly above the screw fastening portion 13*b*. As described, by arranging the screw fastening portion 13*b* and the image reading portion 300, the maintenance crew can access the screw fastening portion 13*b* without removing the image reading portion 300 from the printer body 1. Further, since there is a work space above the screw fastening portion 13*b*, the screws fastened to the screw fastening portion 13*b* can be removed easily, such that the maintenance property can be improved.

A plurality of contact points are provided on a rear end portion of the high-voltage power supply board 13 to apply voltage to the process cartridges 6Y, 6M, 6C, and 6K. The contact points are in contact with a contact spring disposed on the printer body 1, and the high-voltage power supply board 13 applies voltage to the process cartridges 6Y, 6M, 6C, and 6K via the contact spring.

Since the high-voltage power supply board 13 is fixed by a hook provided on a front side of the printer body 1, the maintenance crew disengages the hook and lifts up a front portion of the high-voltage power supply board 13. Next, the maintenance crew lifts up and moves the high-voltage power supply board 13 frontward, and separates the plurality of contact points disposed on a rear portion the high-voltage power supply board 13 from the contact spring disposed on the printer body 1. Then, after all the contact points of the high-voltage power supply board 13 have been separated from the contact springs disposed on the printer body 1, the maintenance crew moves the high-voltage power supply board 13 leftward to thereby remove the high-voltage power supply board 13 from the main body frame 90. By carrying out the above-described procedure in the opposite order, the high-voltage power supply board 13 can be attached to the main body frame 90.

As described above, the toner collecting container 22 that can be replaced by the user can be removed in the front-rear direction in a state where the front door FD is opened. Meanwhile, the high-voltage power supply board 13, the replacement operation of which is performed by the maintenance crew, is arranged below the toner collecting container 22, and arranged such that it can be accessed from the left side instead of the front side of the printer body 1. Further, the high-voltage power supply board 13 can be attached to and detached from the printer body 1 by moving the same in the right-left direction, such that it can be distinguished from parts that can be replaced by the user. That is, the attachment/detachment direction of the high-voltage power supply board 13 differs from the attachment/detachment direction of the sheet feed unit 30, the registration unit 40, the secondary transfer unit 50, and the sheet discharge unit 60 serving as a plurality of conveyance units. In other words, the high-voltage power supply board 13 is removed from a side of the apparatus body 1A opposite to the jam removal cover 70 side. Therefore, the possibility of a user erroneously accessing and touching the high-voltage power supply board 13 can be reduced.

OTHER EMBODIMENTS

The present embodiment adopts a configuration in which the relay board 80 can be accessed by opening the jam removal cover 70 disposed on a right side face of the apparatus body 1A, but the present technique is not limited thereto. In other words, the present technique is not limited to adopting the jam removal cover 70, and it can adopt any cover that can be opened and closed with respect to the apparatus body 1A and that allows access to the relay board 80 when opened. Further, instead of being arranged on the right side face, the relay board 80 can be arranged on any of the front face, the rear face, and the left side face of the apparatus body 1A. That is, in a configuration in which the plurality of conveyance units are attached to and detached from the apparatus from the left side face, the effects of the present technique can be obtained by also arranging the relay board on the left side face.

According to the present embodiment, the image forming apparatus 1000 includes the printer 400 and the image reading portion 300, but the present technique is not limited thereto. For example, the image reading portion 300 can be omitted, and only the printer 400 can serve as the image forming apparatus. Moreover, the feeder 100 and the large capacity sheet feed deck 200 can be omitted, and only the printer body 1 can server as the image forming apparatus.

According further to the present embodiment, the sheet feed unit 30, the registration unit 40, the secondary transfer unit 50, and the sheet discharge unit 60 are listed as an example of the plurality of conveyance units, but the present technique is not limited thereto. The conveyance unit can be any unit as long as it can convey sheets.

Further, the printer 400 adopting an electrophotographic system has been described in all the embodiments described above, but the present technique is not limited thereto. For example, the present technique is also applicable to ink-jet printers in which images are formed on sheets by discharging liquid ink through nozzles.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-091901, filed Jun. 6, 2022, which is hereby incorporated by reference herein in its entirety.

What is claimed is:

1. An image forming apparatus comprising:

an apparatus body including an image forming unit configured to form an image on a sheet; and an opening/closing cover configured to be openable and closable with respect to the apparatus body and configured to expose an opening portion of the apparatus body by being opened with respect to the apparatus body, wherein the apparatus body includes:

a main body frame, a conveyance unit configured to convey the sheet and be attached to the main body frame, the conveyance unit being detachable from the main body frame in a detachment direction through the opening portion, and the conveyance unit including a first connector, a control board configured to control the conveyance unit, a relay board configured to be electrically connected to the control board, the relay board including a second connector configured to be electronically connected to the first connector, the relay board overlapping with the opening portion when viewed in the detachment direction, and a relay board cover configured to cover the relay board, the relay board cover exposing to the opening portion in case of the opening/closing cover being opened, wherein the relay board exposes to the opening portion in case of the opening/closing cover being opened and the relay board cover being removed from the apparatus body, and wherein the relay board is arranged at a position not interfering with a detachment locus in which the conveyance unit is detached from the main body frame in the detachment direction.

2. The image forming apparatus according to claim 1, wherein the main body frame includes a first side panel, and a second side panel arranged with a space formed between the first side panel and the second side panel, wherein the conveyance unit is arranged in the space, and wherein the relay board is arranged on an opposite side from the first side panel across the second side panel.

3. The image forming apparatus according to claim 2, wherein the first side panel and the second side panel are configured to extend in the detachment direction.

4. The image forming apparatus according to claim 2, wherein the control board is arranged on the opposite side from the first side panel across the second side panel.

5. The image forming apparatus according to claim 1, wherein the relay board is configured to face the opening/closing cover in a state closed with respect to the apparatus body, the relay board including a first surface on which the first connector is disposed, a second surface on an opposite side from the first surface, and a third connector disposed on the second surface and configured to be connected to the control board through a signal wire.

6. The image forming apparatus according to claim 1, wherein the relay board is configured to face the opening/closing cover in a state closed with respect to the apparatus body, the relay board including a first surface on which the first connector is disposed, a second surface on an opposite side from the first surface, and a third connector disposed on the first surface and configured to be connected to the control board through a signal wire.

7. The image forming apparatus according to claim 5, wherein the first surface and the second surface extend along a vertical direction.

8. The image forming apparatus according to claim 5, wherein the apparatus body includes a cover member configured to cover the first surface of the relay board.

9. The image forming apparatus according to claim 1, further comprising:

an image reading portion arranged above the apparatus body and configured to read an image from a document, wherein the apparatus body includes a power supply board configured to generate voltage to be applied to the image forming unit, wherein the power supply board includes a fixing portion to be fixed to the main body frame using a fixing tool, and wherein the fixing portion is arranged so as not to overlap with the image reading portion in top view.

10. The image forming apparatus according to claim 9, wherein a detachment direction of the power supply board differs from the detachment direction of the conveyance units.

11. The image forming apparatus according to claim 9, wherein the apparatus body includes a power supply cover that is supported on the main body frame and that covers an upper portion of the power supply board.

12. The image forming apparatus according to claim 9, wherein the power supply board is removed through a side of the apparatus body opposite to a side having the opening/closing cover.

* * * * *